United States Patent
Sterman et al.

(10) Patent No.: US 12,312,720 B2
(45) Date of Patent: May 27, 2025

(54) AUTOMATED KNITTING SYSTEM AND METHOD

(71) Applicant: DELTA GALIL INDUSTRIES LTD., Caesarea (IL)

(72) Inventors: Yoav Sterman, Ein Carmel (IL); Eli Almog, Zurit (IL)

(73) Assignee: DELTA GALIL INDUSTRIES LTD., Caesarea (IL)

( * ) Notice: Subject to any disclaimer, the term of this patent is extended or adjusted under 35 U.S.C. 154(b) by 0 days.

(21) Appl. No.: 18/027,106

(22) PCT Filed: Sep. 30, 2021

(86) PCT No.: PCT/IL2021/051175
§ 371 (c)(1),
(2) Date: Mar. 19, 2023

(87) PCT Pub. No.: WO2022/070188
PCT Pub. Date: Apr. 7, 2022

(65) Prior Publication Data
US 2023/0332340 A1 Oct. 19, 2023

Related U.S. Application Data

(60) Provisional application No. 63/163,893, filed on Mar. 21, 2021, provisional application No. 63/086,083, filed on Oct. 1, 2020.

(51) Int. Cl.
*D04B 9/28* (2006.01)

(52) U.S. Cl.
CPC ...... *D04B 9/28* (2013.01); *G05B 2219/45194* (2013.01)

(58) Field of Classification Search
CPC ............... G05B 2219/45194; G05B 2219/45191–45196; A41H 3/007
(Continued)

(56) References Cited

U.S. PATENT DOCUMENTS 3,844,139 A * 10/1974 De Cerjat ............... D04B 15/66
66/215
3,983,370 A * 9/1976 Caspi ...................... D04B 15/66
66/219

(Continued)

FOREIGN PATENT DOCUMENTS

EP 0684330 A1 11/1995
EP 1878822 A1 1/2008
(Continued)

OTHER PUBLICATIONS

International Search Report in PCT/IL2021/051175, dated Jan. 3, 2022.
(Continued)

*Primary Examiner* — Grace Huang
(74) *Attorney, Agent, or Firm* — AlphaPatent Associates Ltd.; Daniel J. Swirsky

(57) ABSTRACT

A knitting system includes a seamless circular knitting machine. It has a circular set of needles having a particular number of needles (M), in the range of 500 to 2,500 needles, arranged in a circular pattern; and a knit controller to selectively operate each one of the needles on a needle-by-needle basis. The system includes a digital computational design tool, to receive a bitmap image, having a pixel width resolution that is identical to the particular number of needles; and based on analysis of the bitmap image, to generate and to send knitting instructions to the knit controller of the seamless circular knitting machine, based on direct correlation between (I) a particular Nth pixel in a particular Rth row of the bitmap image, and (II) needle activity of a corresponding particular Nth needle when said Nth needle knits the Rth row of a knitted product.

14 Claims, 13 Drawing Sheets

(58) Field of Classification Search
USPC .......................................... 700/141, 130–144
See application file for complete search history.

(56) References Cited

U.S. PATENT DOCUMENTS

| | | | | | |
|---|---|---|---|---|---|
| 4,078,253 | A | * | 3/1978 | Kajiura | ................ D03C 19/005 |
| | | | | | 700/131 |
| 4,332,150 | A | | 6/1982 | Grozinger | |
| 4,346,366 | A | * | 8/1982 | Kajiura | ................ G06T 1/0007 |
| | | | | | 700/141 |
| 4,479,368 | A | * | 10/1984 | Gloeckler | ............. D04B 15/66 |
| | | | | | 340/14.66 |
| 5,719,777 | A | * | 2/1998 | Kotaki | .................. D04B 37/02 |
| | | | | | 700/131 |
| 6,269,282 | B1 | * | 7/2001 | Burger | .................. D04B 15/66 |
| | | | | | 700/131 |
| 6,397,121 | B1 | * | 5/2002 | Kawamura | ............. D05B 7/00 |
| | | | | | 112/27 |
| 6,611,730 | B1 | * | 8/2003 | Stoll | ........................ D04B 7/26 |
| | | | | | 700/131 |
| 7,130,711 | B2 | * | 10/2006 | Dabrowa | ............... D05C 15/34 |
| | | | | | 700/131 |
| 7,272,462 | B2 | * | 9/2007 | Smedley | ................ D04B 37/02 |
| | | | | | 700/141 |
| 7,400,938 | B2 | * | 7/2008 | Ganzoni | ................ D04B 1/265 |
| | | | | | 66/232 |
| 7,460,927 | B1 | * | 12/2008 | Lai | ........................... D04B 7/08 |
| | | | | | 66/232 |
| 8,726,701 | B2 | * | 5/2014 | Habert | ................... D04B 15/66 |
| | | | | | 66/232 |
| 8,958,902 | B2 | * | 2/2015 | Levine | ................... D04B 1/126 |
| | | | | | 700/141 |
| 9,032,762 | B2 | * | 5/2015 | Begriche | ................. D04B 1/22 |
| | | | | | 66/171 |
| 9,506,172 | B2 | * | 11/2016 | Atmanspacher | ....... D04B 1/102 |
| 10,995,433 | B1 | * | 5/2021 | Bergeron | ................. D04B 1/12 |
| 11,293,124 | B2 | * | 4/2022 | Morgan | .................. G06F 30/00 |
| 11,421,355 | B2 | * | 8/2022 | Karmon | ................. D04B 37/00 |
| 11,681,421 | B2 | * | 6/2023 | Schultz | ............... G06F 3/04883 |
| | | | | | 715/810 |
| 2022/0186413 | A1 | * | 6/2022 | Andreoli | ................ D04B 35/32 |

FOREIGN PATENT DOCUMENTS

| | | |
|---|---|---|
| GB | 1187018 A | 4/1970 |
| GB | 2559567 A | 8/2018 |
| WO | 2006/045135 A1 | 5/2006 |

OTHER PUBLICATIONS

Written Opinion of the International Searching Authority in PCT/IL2021/051175, dated Jan. 3, 2022.

Ayelet Karmon et al., "KNITIT: a computational tool for design, simulation, and fabrication of multiple structured knits", Proceedings of the 2nd Annual ACM Symposium on Computational Fabrication, Jun. 2018.

Wonseok Choi et al., "The development of specialized knitted structures in the creation of resist-dyed fabrics and garments", The Journal of The Textile Institute, 99(3), pp. 253-264, Jun. 2008.

European search report in European patent application No. EP 21874735.0, mailed on Oct. 9, 2024.

* cited by examiner

Garment Design Workstation 310

| Garment Design Unit 311 | Image Creator / Importer Unit 312 |
|---|---|
| Image Scaler Unit 313 | Cell Defining Module 314 |
| Effect Creator Module 315 | Tie-Dye / Dip-Dye Effect Unit 316 |

Rules Selection and Applying Unit 320

Stretch-Level Gradual Changer Unit 317

Breathability Level Gradual Changer Unit 318

| Color Transition Unit 319 | Color-Picking Module 322 |
|---|---|

Rules Selection and Applying Unit 320

Parameters Modification Unit 321

| Simulated Image Generator 323 | Bitmap File Generator / Editor 324 |
|---|---|

Bitmap to Knitting Instructions Convertor Unit 325

Seamless Circular Electric Knitting Machine 350

| Knitting Needles 351 | Yarn Feeders 352 | Actuators 353 |
|---|---|---|
| Actuation Controller 354 | Knit Controller 355 | |

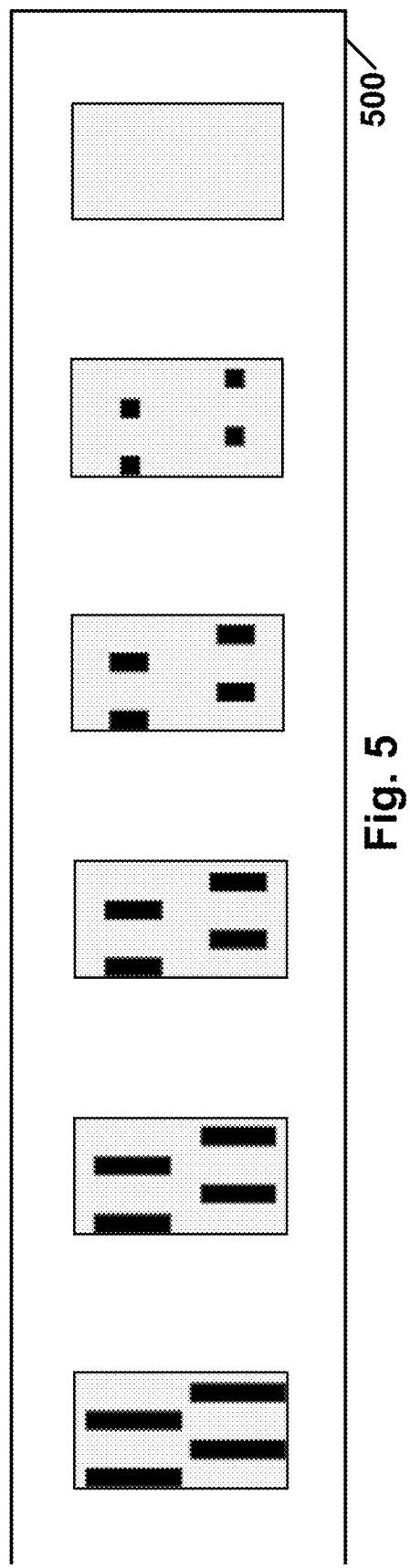

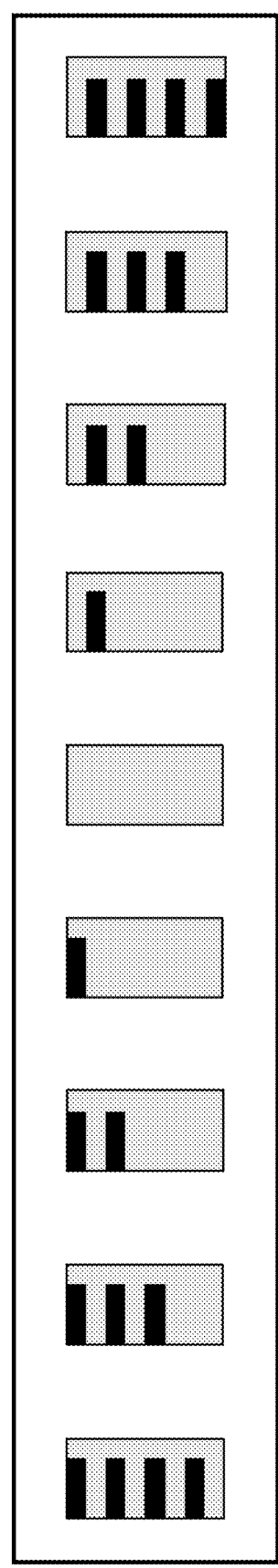

AUTOMATED KNITTING SYSTEM AND METHOD

CROSS-REFERENCE TO RELATED APPLICATIONS

This patent application is a National Stage of PCT international application number PCT/IL2021/051175, having an International Filing Date of Sep. 30, 2021, published as international publication number WO 2022/070188 A1, which is hereby incorporated by reference in its entirety; which claims priority and benefit from (i) United States provisional patent application number U.S. Ser. No. 63/086,083, filed on Oct. 1, 2020, which is hereby incorporated by reference in its entirety; and (ii) United States provisional patent application number U.S. Ser. No. 63/163,893, filed on Mar. 21, 2021, which is hereby incorporated by reference in its entirety.

FIELD

Some embodiments are related to the field of clothing.

BACKGROUND

Clothing articles and clothes are typically formed of textile material and are worn on the body. Clothes are worn for various purposes, for example, to keep the human body warm in a cold weather, to protect the human body from rough surfaces or insects or plants, to provide a hygienic barrier between the human body and the environment, to protect the human body from ultraviolet radiation, to cover genitals, for social reasons or as fashion, or the like.

SUMMARY

In some embodiments, a knitting system includes a seamless circular knitting machine. It has a circular set of needles having a particular number of needles (M), in the range of 500 to 2,500 needles, arranged in a circular pattern or arranged as circle; and a knit controller to selectively operate each one of the needles on a needle-by-needle basis.

The system includes a digital computational design tool, to receive a bitmap image, having a pixel width resolution that is identical to the particular number of needles; and based on analysis of the bitmap image, to generate and to send knitting instructions to the knit controller of the seamless circular knitting machine, based on direct correlation between (I) a particular Nth pixel in a particular Rth row of the bitmap image, and (II) needle activity of a corresponding particular Nth needle when said Nth needle knits the Rth row of a knitted product.

Some embodiments may provide other and/or additional benefits and/or advantages.

BRIEF DESCRIPTION OF THE DRAWINGS

FIG. 3 is a schematic block-diagram illustration of a knitting system, in accordance with some demonstrative embodiments.

FIG. 5 is a schematic illustration of a series of knit structures for a Computational Design (CD) tool, in accordance with some demonstrative embodiments.

FIG. 8 is a schematic illustration of a series of knit structures for the CD tool, which may be used for knitting a garment having a tie-dye resembling knit pattern, in accordance with some demonstrative embodiments.

DETAILED DESCRIPTION OF SOME DEMONSTRATIVE EMBODIMENTS

Figure 1:
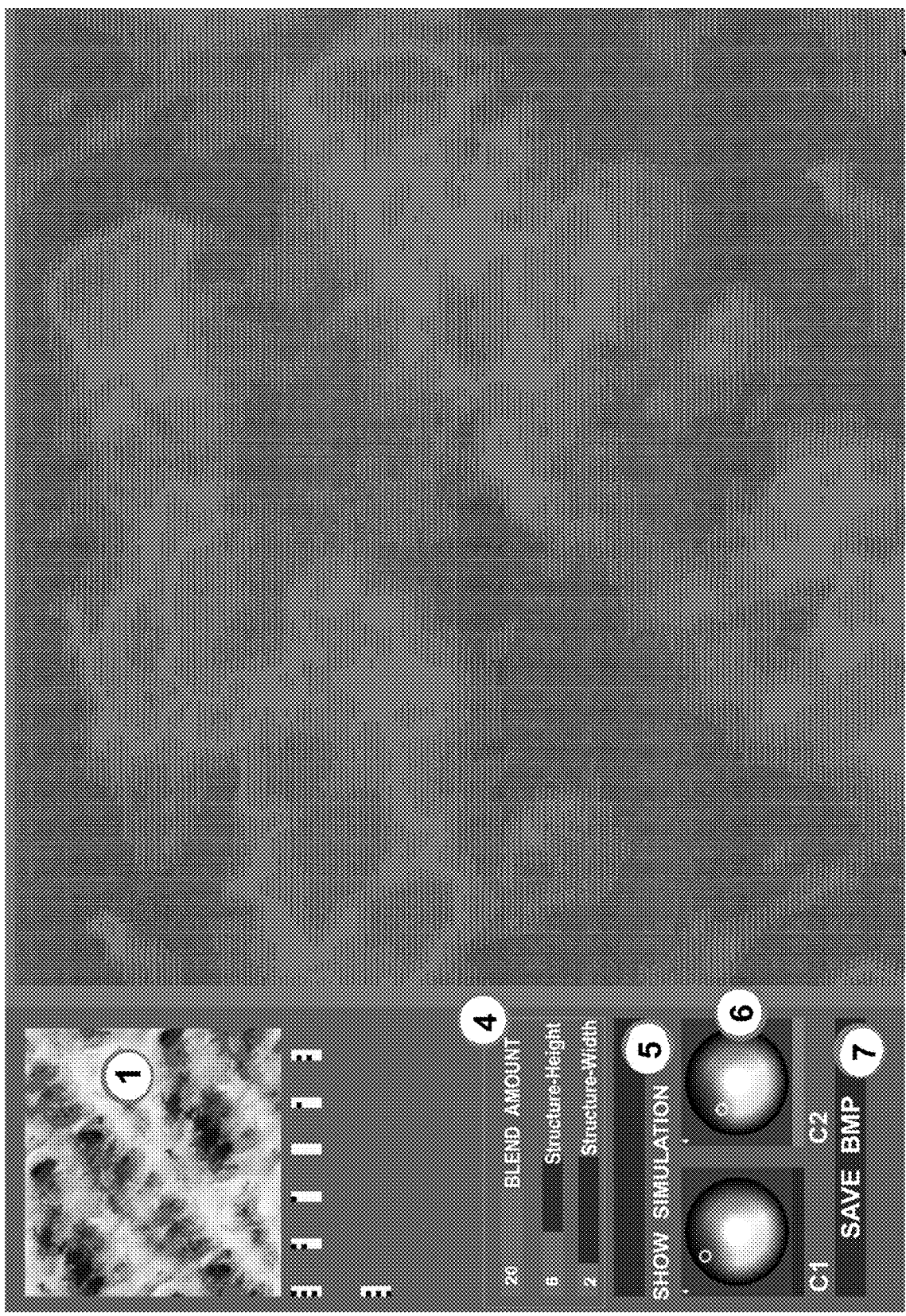
FIG. 1 and FIG. 2 are illustrations of an on-screen interface of a computerized design tool, in accordance with some demonstrative embodiments.

Some embodiments include automated knitting systems and automated knitting methods; for example, digital parametric tools for industrial circular knitting of clothes and garments.

The system and method of some embodiments may enable computer based or computer aided design and manufacturing of apparel products, such as bras, socks, leggings, pants, underpants, shirts, tops, and/or other clothes, utilizing a circular knitting machine that is programmed and configured in accordance with the present invention.

The system of some embodiments may expend the design possibilities of circular knitting machines, and enable the apparel designer to efficiently design complex organic designs and gradual transitions between colors and performance zones; such as, gradual transition from a breathable region of the garment to a non-breathable region of that garment, and/or gradual transition from a stretch region of the garment to a lock-down region of the garment, and/or gradual transition from a first color (or shade) to a second color (or shade) within the same garment.

The system of some embodiments may further provide added value and new structural features and functional features for certain apparel products. For example, the system of the present invention may be used to create a bra having a cup-like three-dimensional (3D) shape or structure which is generated as a direct output of the knitting machine, without the need for a molding process.

Furthermore, the system of some embodiments may enable efficient and automated or semi-automated manufacturing of tie-dye or dip-dye visual effects in garment; and may enable direct creation and knitting of a tie-dye shirt or other garment as an immediate and direct output of the knitting machine, without requiring an additional process (which is often polluting and/or expensive) of actual tie-dye and dip-dye (e.g., in which a conventional shirt or garment, optionally tied or wrapped, is dipped in liquid colors and is then dried for a long time); and may enable direct creation of a similar visual effect via direct knitting.

The system of some embodiments enables a direct workflow between the design tool and the knitting machine. The knitting instructions that are fed into the knitting machine are based on, and/or prepared by or based on, the output of the computerized garment design tool. This may further increase the efficiency, and reduce the time and efforts, for garment development and manufacturing, may reduce manufacturing costs and manufacturing time, and may further increase the efficiency of related processes (e.g., grading, or creating a size set).

The system of some embodiments provides computerized design tools, written in Java or in other suitable programming language. The tools may have an efficient and intuitive user interface, and may be used by a textile designer, a fashion designer, a garment designer, an apparel designer, a knitting technician, a pattern-maker, or other persons, which need not have particular knowledge in computer programming. The design tools are parametric and computationally driven, thereby allowing to rapidly explore various iterations or alternatives, as well as efficient trial and inspection of various options before the actual knitting of the selected design of the intended garment.

In some embodiments, the computerized design tools may utilize (or may be based on) an image, such as a grayscale image or a color image, that drives the distribution of pixels to create a bitmap that is then imported into (or converted for) the knitting software. For example, a garment designer may utilize the system of the present invention to create a black-and-white gradient image or a grayscale gradient image, taking into account the size and other requirements of the intended garment and the desired aesthetics. The computerized garment design tool enables the garment designer to utilize on-screen sliders, or other suitable GUI elements, in order to efficiently modify parameters (e.g., the level of randomness in a designed region or in a pattern; the level of gradual transition between features; or the like), and to view in real time or in near-real-time an on-screen representation of the designed garment or garment-region, reflecting the modified parameters.

Some embodiments include design tools that may operate with one or more types of circular knitting machines; for example, sock knitting machines, seamless garment knitting machines, Terrot knitting machines, Jacquard knitting machines, and/or knitting machine that produce rolled fabrics. Some tools of the present invention may be particularly configured for a specific knitting machine; while other tools of the present invention may operate generally I conjunction with various types of different machines and knitting technologies.

For example, a Dip-Dye Design Tool may be a specific tool in accordance with the present invention, configured to operate with a Seamless knitting machine. The tool generates automatically and digitally visual effects that correspond to a tie-dye and/or dip-dye pattern, without requiring an expensive and polluting processes for obtaining such effects or visual patterns.

For example, a computer or a workstation or a computerized platform is utilized to control a Seamless knitting machine (e.g., the single-knit or double-knit Seamless Santoni knitting machine, manufactured by Santoni of Italy). For example, the circular knitting machine has 8 yarn feeding points; each yarn feeding point is equipped with actuators or other electronic units which enable the system of the present invention to individually and selectively control each needle, in each knitting row, on a pixel by pixel basis, or on a point by point basis, or on a knitting-point by knitting-point basis. The system of the present invention generates the set of commands or instructions that those 8 actuators receive from the DIS program.

In accordance with some embodiments, for example, for imitating or simulating via knitting, and not via dipping in liquid color, the Tie Dye effect or the Dip Dye effect, an alternate knitting technique may be used. Rows of fabric are knitted with yarns of alternating colors; a first color for the odd rows, and a second color for the even rows. For example, the alternate knitting may be performed via a Seamless Santoni knitting machine, having a diameter of 13 inches, and having machine gauge of 28 gg (needles per inch), and having 1,152 knitting needles.

Figure 2:
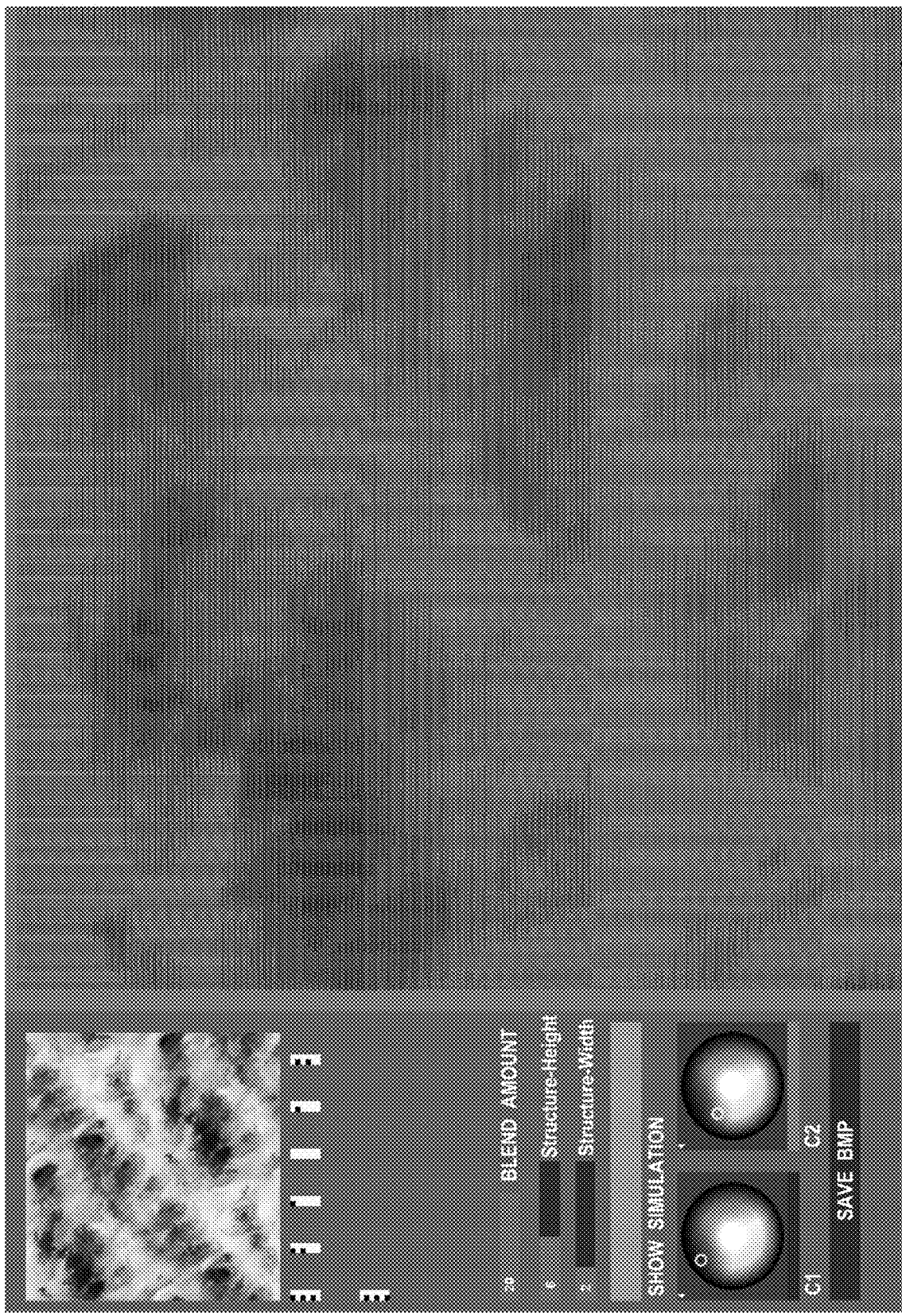

Reference is made to FIG. 1 and FIG. 2, which are illustrations (100 and 200, respectively) of an on-screen interface of the computerized design tool, in accordance with some demonstrative embodiments.

As indicated by numeral 1, the tool enables receiving or importing as input a grayscale image, which is utilized as the input data to the tool. Optionally, the tool allows to input or import a color image, and automatically converts it to a grayscale image that is then furthered utilized. The size of the image (e.g., the width and the height, in pixels) will also be the size of the output bitmap that is then fed into the knitting machine software. Each single pixel in the image corresponds to one single needle in the knitting machine; therefore, it may be beneficial that the width of the image will be the same as the needle count of the knitting machine. For example, a knitting machine having 1,152 needles, would be served well by a computerized design tool that utilizes a grayscale image having a width of exactly 1,152 pixels, to enable exact correspondence of one pixel per one needle.

The grayscale image is imported to the computerized design tool. The tool divides the image into small cell blocks. Each cell block is sampled for its brightness of pixels, and is then mapped to a knit structure selected from the options that are displayed to the designer. The knit structures are created automatically by the tool, based on parameters (e.g., Structure-Height and Structure-Width) that are shown in the user interface and that the garment designer can modify (Numeral 4). The knit structures are generated, from dense structure on the odd rows to sparse structure in the middle to dense structure on the even rows. The dense structure on the odd rows are mapped to the dark areas on the image; the dense structure in the even rows are mapped to the white areas; all the other structures are mapped in between.

The garment designer may modify values of parameters using the GUI (Numeral 4). For example, a Blend-Amount slider allows the garment designer to control the blend between zones or regions of the garment. When this slider is set to its maximum volume, the tool will create a zonal separation between two regions having different brightness levels in the image or the garment. When this slider is set to its minimum value, the zones of brightness in the image or the garment will blend and will create a gradual transition between zones. The blending is performed by an algorithm that performs dithering and/or half-toning to generate a gradual transition between a first color (a source color) and a second color (a target color); taking into account that, for example, a knitted point in which a stitch is knitted has the first color, and a knitted color in which there is a "miss" or a "skip" (no stitch) has a different shade or the first color; such that a programmatic and controlled color transitioning or gradient creation is enabled. Some embodiments may thus create gradual transitions among regions or colored-regions or colored-spots of the knitted garments, and/or blending or gradual blending or gradual fusion of adjacent knit-structures or knitting patterns.

The sliders of Structure-Height and Structure-Width allow the garment designer to modify the size of the cell structure. For example, modification of the Structure-Height parameter affects and controls the number of cell structures being used, such as, from a minimum of 3 cells, to a maximum of 13 cells. The Structure-Width similarly controls the width of the cell structure.

The cell structures used by the computerized tool to generate the commands for the circular knitting machine. For example, a pink pixel (that may later be converted to be a yellow pixel, for some types of knitting machine software) indicates a single jersey knitting. The black pixels indicate a "Miss knitting", such that the knitting machine needle does not make a knit stitch at the location of that pixel, and the color will not be visible. For example, when the value of the Structure-Width parameter is set to its maximum. there are 5 Miss knitting needles followed by one single jersey knit; whereas, when the value of the Structure-Width parameter is set to its minimum, there will be only one Miss knitting needle followed by one jersey knit.

All the Pink pixels in the DIS knitting program, will knit the chosen pixel on the face of the fabric; whereas, all the Black pixels will eliminate the chosen pixel on the back of the fabric. The overall image and look of the garment will thus be achieved based on the thousands of pixels as modified via the computerized tool, which mix the two the two pre-dyed yarns or the two pre-colored yarns, at different gradation and density, and will thus enable a direct knitting of a garment that simulates, via alternate knitting and point-by-point knitting instructions, to simulate or emulate or mimic via knitting a Tie Dyed or Dip Dyed garment or garment-region.

The computerized design tool may then simulate the knitted fabric, via an on-screen image that is generated and shown; such as, the simulated garment-region image that is demonstrated in FIG. 2. Accordingly, FIG. 2 is another illustration of an on-screen interface of a computerized design tool, in accordance with some demonstrative embodiments For example, by pressing a "Show Simulation" button (Numeral 5 in FIG. 1), the display is changed by the design tool to show the simulation of the knitted fabric. The algorithm of the design tool calculates the effect of the knitted structures on the color visibility of the yarns that composes the fabric.

Two colors wheels (Numeral 6), or other color-picking or color-selection GUI elements, allow the designer to select the two yarn colors that will be used for actually knitting the fabric based on the knitting instructions that the tool generates based on the image.

The design tool enables the garment designer to save the bitmap representation (Numeral 7), namely, to save the black-and-pink image (not the simulation image), as a bitmap image (e.g., a BMP file). This bitmap is then used by the knit technician, in the DIS knitting software, to create the final working file that the knitting machine utilizes for the actual knitting process. For example, the knit technician, or an automatic conversion module of the garment design tool, may convert the bitmap image to the suitable format for the DIS program, and/or may prepare the main knitting program.

The knitting process may further comprise loading of the relevant yarns onto or into the knitting machine. For example, in the four Odd feeds, a pre-dyed or pre-colored Polyester Yellow yarn may be fed; whereas, in the four Even feeds, a pre-dyed or pre-colored Polyester Blue yarn may be fed. The knitting program is loaded or transferred to the machine, and the automated knitting process is performed, to directly yield, via precise knitting that is based on the instructions that selectively and individually instruct each needle; thereby directly producing, for example, a garment formed of exactly two pre-colored or pre-dyed yarns, wherein the garment has region(s) that simulate or mimic via selective knitting a visual appearance of a Tie-Dye or a Dip-Dye production process.

Reference is made to FIG. 3, which is a schematic block-diagram illustration of a knitting system 300, in accordance with some demonstrative embodiments.

A Garment Design Workstation 310 may be or may comprise a computer (e.g., a desktop computer, a laptop computer) or a computing device (e.g., a tablet, a smartphone); which may include, for example, a processor, a memory unit, a storage unit, input unit(s) (e.g., keyboard, mouse, touch-screen, touchpad, microphone), output units (e.g., screen, touch-screen, display unit, monitor, audio speakers), an Operating System (OS) with drivers and applications, a power source, and one or more transceivers (e.g., wired communication transceiver, wireless communication transceiver, Wi-Fi transceiver, Bluetooth transceiver).

A Garment Design Unit 311 or a garment-design application or "app" or program or software or module may run on the Garment Design Workstation 310, as a native application or program, or as a stand-alone application or program, or as an application within a web browser (e.g., code in JavaScript and HTML5 and CSS), or as a Java application (e.g., as a stand-alone Java application or compiled program, or as an in-browser applet or application).

An Image Creator/Importer Unit 312 enables the garment designer to create a grayscale image by providing image creating and image editing modules (e.g., similar to Adobe Photoshop), or by providing modules for selecting and importing an already-prepared image.

An Image Scaler Unit 313 may check that a particular size dimension (e.g., width) of the image, in pixels, matches a pre-defined or a configurable value indicating the number of needles of the intended knitting machine; and may alert the garment designer to crop or to enlarge the image, or may automatically crop or enlarge the image such that the number of pixels in the width dimension of the image would be identical to the number of discrete needles of the knitting machine.

A Cell Defining Module 314 may define the size of a Cell, which is utilized by the design tool. The size of a Cell may be modified based on the values of other parameters that are modifiable by the garment designer. In some embodiments, The smallest cell size is 2 by 2 pixels; and the largest cell size is 6 by 12 pixels. The actual physical size of a cell may be determined by the ratio of pixels to millimeters, and/or may further be a function of the knit instructions within the cells (e.g., number of "Miss" pixels and the number of jersey pixels) and/or the yarns used and/or the knitting machine settings. In some embodiments, for example, a Cell may correspond to approximately 3 by 3 millimeters of relaxed fabric.

Optionally, an Effect Creator Module 315 adds or creates the particular knitting pattern to match a particular visual effect or visual pattern or structural effect or structural pattern. In some embodiments, the Effect Creator Module 315 may enable the garment designer to select, and to apply to the intended garment, multiple effects that may be applied automatically to the same region or to different regions.

For example, a Tie-Dye/Dip-Dye Effect Unit 316, which may execute an algorithm that converts a visual Tie-Dye/Dip-Dye effect from the input image, into a needle-selective pattern that indicates to the knitting machine which yarn and which knitting (jersey or miss) to perform at each point. The Tie-Dye/Dip-Dye Effect Unit 316 applies an algorithm that translates the desired visual effect that is reflected in the input image, to a set of needle-by-needle instructions or instruction representations.

Optionally, a Stretch-Level Gradual Changer Unit 317 may execute an algorithm that determines the individual instructions for each needle of the knitting machine, in order to achieve a gradual change in stretch level or elasticity or flexibility or rigidity of the garment.

Optionally, a Breathability Level Gradual Changer Unit 318 may execute an algorithm that determines the individual instructions for each needle of the knitting machine, in order to achieve a gradual change in the breathability properties of the garment.

Similarly, a Color Transition Unit 319 may execute an algorithm that determines the individual instructions for each needle of the knitting machine, in order to achieve a gradual transition from a first color (in a first location or region in the intended garment) to a second color (in a second location or region in the intended garment). Optionally, it may utilize a dithering algorithm and/or a half-toning algorithm, to create a gradual transition from a first color to a second color.

A Rules Selection and Applying Unit 320 operates to select, from a pre-programmed list or table or database of rules or sets-of-rules, the suitable rule or rules that are utilized by one or more of the above-mentioned units or modules. For example, the system may comprise pre-programmed rules or tables, that indicate that a gradual transition from a first color to a second color, over a distance of 20 pixels, is performed (for example) by knitting Jersey in point 1, then knitting Jersey in point 2, then Miss in point 3, then Jersey in point 4, then Miss in point 5, and so forth in accordance with a pre-programmed pattern that corresponds to such gradual transition. Similarly, a different table or rules may be pre-programmed to indicate the required needle-by-needle or point-by-point or pixel-by-pixel knitting properties (e.g., Jersey or Miss) in order to achieve a particular color or shade in a region, or in order to provide a transition of breathable to non-breathable fabric, or in order to create a Tie-Dye/Dip-Dye effect, or in order to create a stretch-level transition, or the like.

A Parameters Modification Unit 321 enables the garment designer to modify or adjust or set the values for one or more of the parameters, that the above-mentioned algorithms utilize in their calculations. The adjustment may be performed via one or more on-screen GUI elements, for example, on-screen sliders that can be moved within a spectrum of values, or fields in which a value may be typed, or a drop-down menu with pre-defined values or ranges-of-values, or the like.

A Color-Picking Module 322 enables to select or set or change the color(s) of yarn(s) that would take part in the knitting process; from a pre-defined palette of colors, and/or from a pre-defined set of colors that match a pre-defined variety of particular pre-colored yarns.

A Simulated Image Generator 323 operates to generate and to present on the screen a simulated view or simulated visual representation of garment, such that the needle-by-needle information or the knitting-point-by-knitting-point information that was generated by the previous modules, is transformed to a visual representation that mimic that actual visual appearance of the resulting knitted yarns. This enables the garment designer to view a simulated visual appearance of the garment or the garment-region that is intended to be knitted, based on the particular settings that the designer has selected or entered A Bitmap File Generator/Editor 324 generates or exports or saves a bitmap representation of the needle-by-needle or the knitting-point-by-knitting-point information; and is further capable of allowing a user to edit or modify such bitmap file using an on-screen interface or a Graphical User Interface (GUI).

A Bitmap to Knitting Instructions Convertor Unit 325 may convert the Bitmap representation into a file or a dataset of knitting instructions in the format that can be read and processed and acted upon by the particular knitting machine. The Bitmap to Knitting Instructions Convertor Unit 325 may be part of the Garment Design Workstation 310; or may be part of a separate device or unit, such as a knit technician workstation; or may be otherwise operable associated with the knitting machine. The conversion may be performed, for example, based on pre-defined conversion rules, a lookup table, or a pre-programmed conversion algorithm. For example, individual pixel colors are translated or converted to knitting machine instructions; each row of pixels corresponds to a needle in a row of knitting; a black pixel indicates Miss (the needle stats down and does not create a knit loop), whereas yellow pixels (or pink pixels, or other non-black pixels) indicate jersey knitting (the needle moves upwardly and creates a knit loop).

Garment Design Workstation 310 may be operably associated with a Seamless Circular Electric Knitting Machine 350, having multiple Knitting Needles 351. Yarn Feeders 352 (e.g., eight yarn feeders) store or hold thereon yarns, each yarn feeder holding a yarn wrapped around a cylindrical member. The Knitting Needles 351 are selectively and individually controlled or actuated via Actuators 353, which are able to selectively move or slide or push or lift based on an actuation command received from an Actuation Controller 354, which in turn generates the suitable actuation command based on the knitting instructions generated from the bitmap image that was produced by the Garment Design Workstation 310. A knit controller 355 operates to receive, from the Garment Design Workstation 310, the Bitmap file and/or a set of Knitting Instructions (e.g., derived or prepared by the workstation from the bitmap file); and to selectively actuate or control or command each one of the actuators and/or the needles to operate, to stitch, to avoid stitching or to "miss" or to "skip", to move upwardly, to move downwardly, to rest and not move, and/or to perform other knitting-related operations.

The article or the garment that is produced directly by the Knitting Machine 350, based on the instructions generated via the Garment Design Workstation 310, is an entire garment (or, in some embodiments, a garment-region) which already includes therein knitted areas or knitted structures that simulate the desired effect that was designed via the Garment Design Workstation 310, without the need to further color or dye the knitted garment.

Some embodiments provide Computational Design (CD) tools for seamless circular knitting and digital knitting processes. The Applicants have realized that in contrast with conventional flatbed knitting machines, some fabrics may be knitted using circular knitting technologies. Some embodiments provide digital seamless knitting, which is a special kind of circular knitting that may be used to create seamless garments on a knitted cylinder. This allows for the creation of garments with multiple knitting structures, which affect the properties and/or behavior of the material throughout the fabric. Some embodiments provide a novel computational approach for the design and programming of seamless circular knitting. This computational design tool may be used by fashion and textile designers. The design tools enable gradual transition between knit structures and organic patterns.

The Applicants have realized that one of the historical effects of the industrial revolution is the specialization and segregation of the field of craftsmanship into multiple separate occupations that come together in the design and creation of new products. One of the reasons for this is that, as technology advances, tools, both hardware and software, become so complex that it takes years of training and experience to master them. This means that it is only possible to master a small number of tools, and any one person is only able to specialize in a small part of the making process. The segregation of disciplines is especially prominent in the textile industry, particularly in digital knitting. There are many workers involved in the process of creating knitted garments. In a conventional process, realized the Applicants, fashion designers start the process with a sketch or illustration of the product; then pattern makers, knit programmers, and knitting technicians work each in their own field to produce a physical knitted sample. Sometimes workers from additional fields are involved: yarn experts, textile designers, design directors, color designers, and more. This cycle goes through several iterations, since the first few sample products usually differ from the original intention of the designer.

The Applicants have realized that Computational design (CD) tools have the potential to bridge the gap between the designer's intent and the resulting product. This may be done by automating and/or shortening complex manufacturing systems and design workflows through algorithms, and by providing users with these solutions through an intuitive User Interface (UI).

The Applicants have realized that conventional digital knitting tools are still complex to operate and/or complicate to learn or to master. Conventional tools require a significant amount of learning, and most designers do not reach the level of knowledge needed to use them. Designers tend to focus on their creative skills, and/or may lack some analytic and mathematical skills required for coding.

In accordance with some embodiments, an efficient UI for computational design tools may simplify and/or shorten the process of working with algorithms, and/or may allow fashion designers or garment designers to express their creativity in ways that were not available to them in the past.

Figure 4B:
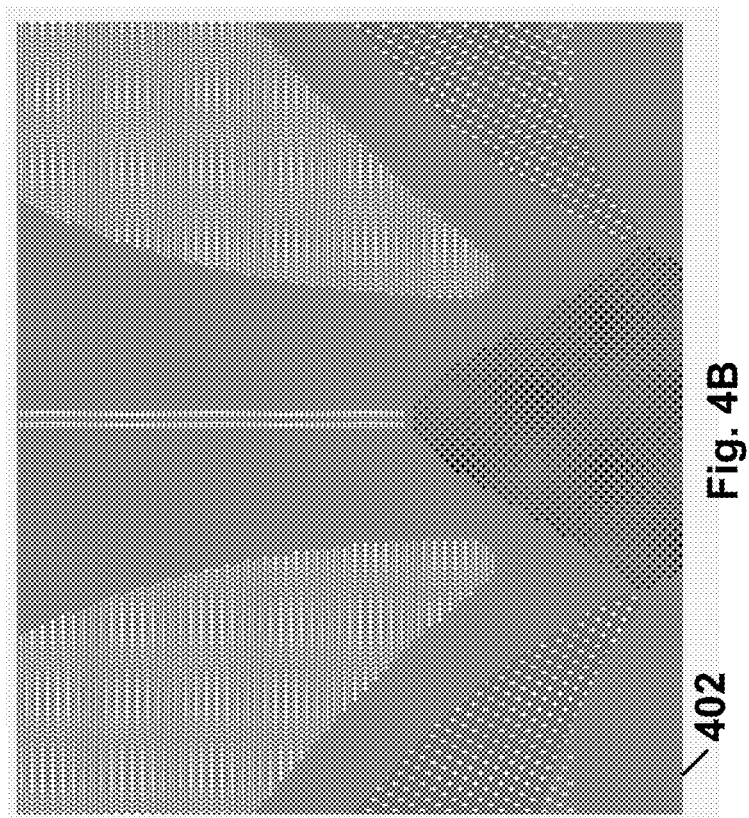
FIG. 4B is an illustration of another bitmap image, which may be generated by a knit programmer.
Figure 4A:
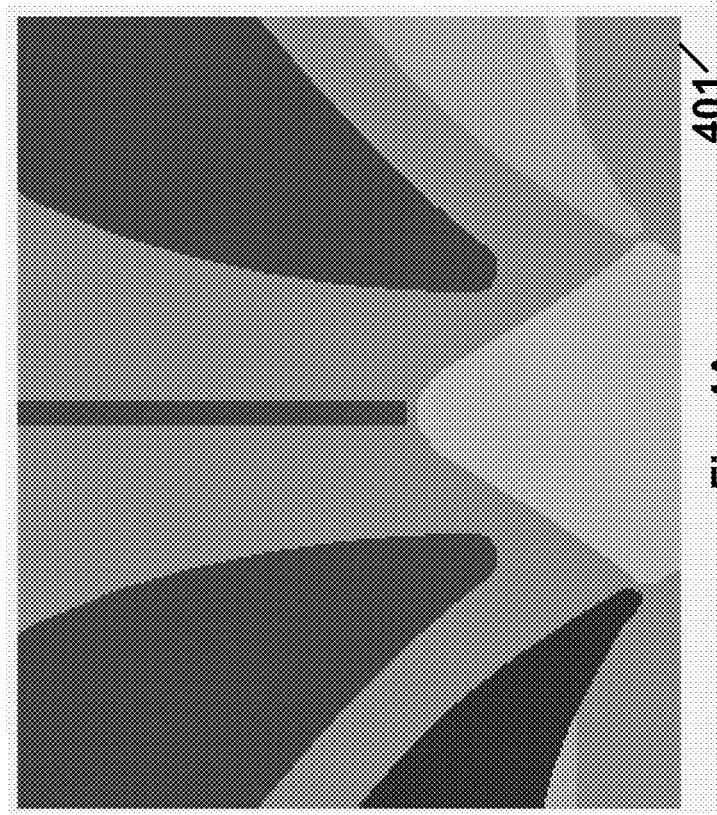
FIG. 4A is an illustration of a bitmap image, which may be created and used in accordance with some embodiments.

Reference is made to FIGS. 4A-4B, which are illustrations of two bitmap images which may be utilized in a seamless digital knitting process. FIG. 4A demonstrates a bitmap image 401, which may be created by a pattern-maker. In image 401, each color represents a different performance zone; and the garment includes several such distinct zones. FIG. 4B demonstrates a bitmap image 402, which may be generated by a knit programmer, who then inserts different pixel-based knitting instructions into each zone.

In accordance with some embodiments, CD tools not only simplify complex processes, but also have the potential to increase the design spaces when working with digital knitting technologies. This may be achieved by introducing new workflows that disrupt the standard workflows. Traditionally, the knit programming process begins with a colored bitmap image created by a patternmaker. This bitmap image usually contains a cut mark and color-coded zones. Each color in the image represents a different knit structure, such as a rib, mesh, or jersey, that must be assigned to these zones. The image is transferred to a knit programmer, who generates an additional bitmap image, based on the received bitmap image. The knit programmer generates the second image by assigning pixel-based knitting instructions to the colored zones in the original image. The pixel-coded bitmap image is later translated into knitting instructions used to control the machine needles. This workflow limits the design space available to the digital knitting machine, since it only allows using patterns that are divided into zones. Furthermore, since the pattern bitmap image is usually comprised of thousands (or tens-of-thousands, or hundreds-of-thousands) of pixels, it is not practical or it is virtually impossible to create a design by drawing or modifying or manipulating pixels manually on a pixel-by-pixel basis. Rather, by using the CD tools of some embodiments, it is possible to expend the design space of the knitting machines and use designs that are not necessarily zonal or are not necessarily zone-based, such as designs with gradual changes in color, stretch-ability (or stretching ability, or stretching capability), and/or complex organic patterns.

Some embodiments provide a CD tool for digital circular seamless knitting; and may provide benefits of using CD tools for design, productivity, and sustainability of textile products. In accordance with the seamless knitting, a fabric is knitted in the shape of a cylinder and then used to produce a single seamless piece of garment without seams. The cylinder is cut, and sleeves are stitched, if needed. In order to create various sizes (S, M, L, XL), scaled versions of the design may be knitted on machines with different cylinder diameters. Seamless knitting may be used to make sportswear, optionally utilizing the ability to define and create different zones that map the body of an athlete. For example, sweat areas of the body may be represented by a visual map, and then open mesh zones may be used in the garment to increase breathability and enhance sweat evaporation on a per-zone basis or a zonal basis.

The CD tool of some embodiments may be used by designers who are not necessarily pre-trained in using CD, and/or have no programming skills or experience. The tool uses algorithms to generate complex organic patterns and/or to create a simulation or an emulation or a knitted version of the final knitted product. The tool's UI is intuitive and efficient, and leaves the designer room for creativity. The tool may use manufacturing constraints that prevent knitting mistakes.

The tool may be used by fashion and textile designers, using digital circular seamless knitting. For example, the tool may work with (or may be operably associated with) a Santoni TOP2V circular knitting machine; other circular knitting machines may be used. The TOP2V machine may use a programing software such as "Graph6", which produces XSK machine language files (e.g., in a proprietary format).

The tool disrupts conventional workflows by computationally generating a pixel-coded bitmap image, without requiring a knit programmer. This bitmap image is then fed into a Graph6 knitting programming software and used to drive the knitting machine. Unlike a convention workflow, this process requires no intervention or only minimal intervention by a knit programmer. The tool uses an intuitive UI, since the goal of the tool is to empower garment designers and knit designers to use computational algorithms and express their creativity without the need to write computer-readable code in a programming language.

In accordance with some embodiments, seamless knitting machines may have various sizes of diameters and needle densities. For example, a TOP2 28-gauge circular knitting machine may be used, and it has nine versions, with diameters ranging from 11 inches to 19 inches. In each version of the machine, the needle count is different, ranging from (for example) 960 needles to 1,728 needles. The bitmap image used for programming a design should match the type and diameter of the knitting machine being used. The width of the bitmap image should match (e.g., should be equal to) the total number of needles in the machine. The required height of the bitmap image varies, for example, depending on the desired length of the fabric cylinder.

The CD tool uses an algorithm to distribute of a series of knitting block structures in order to generate a pixel-coded bitmap image. The blocks are matrixes of color-coded pixels, which are later translated into instructions for the knitting-machine needles. The background of the structure block is yellow (or light-color background), which represents a regular knitting of a single stitch. Black pixels represent a miss stitch. All structure blocks in a series are the same size and the same shape (e.g., rectangular), with slight variations between them (namely, in the content of each block). The blocks are arranged by degree of complexity and detail, from the least complex to the most complex (or, in other embodiments, in a reverse order, from the most complex to the least complex).

Reference is made to FIG. 5, which is a schematic illustration of a set or series 500 of knit structures for the CD tool, in accordance with some demonstrative embodiments. For example, a series of six knit structures or knit blocks are shown, each one being a matrix of 8 (width) by 32 (height) pixels. The amount of information decreases as the series progresses. Yellow pixels (or light-color pixels) indicate regular single-knit stitches; black pixels indicate a "missing" knit stitch.

Some embodiments may provide multiple ways to create the series of knit structures. For example, a first option is to define the desired width and height of the knit structure. The tool then generates the series of knit structures automatically. The number of knit structures depends on the size of the matrix selected. Another way is to upload a series of graphic files (e.g., GIF files) generated ahead of time using an external graphic software. To maintain the correct order, the GIF file names are numbered in a consecutive order. This gives the designer flexibility to create new knit structures and explore new structure combinations. There is no limit to the number of knit structures that may be loaded.

The process of working with the CD tool starts by the user selecting a grayscale image with a width that matches the needle count of the knitting machine that is to be used. The algorithm turns the input image into a grid based on the image size and the size of the knitting blocks. The grid cells are the same size as the knit-structure blocks, and each cell is assigned with one block based on the brightness value measured at the center of the cell. The brightness values range from 0 and 255, where 0 represents the darkest pixels and 255 represents the lightest pixels. To create a smooth transition between zones or regions, and/or to create a gradual pattern or a gradient of color, a blending factor is introduced or added. The blending factor is based on a random or pseudo-random function, but the intensity of the randomness effect is determined by the user, through a blending factor slider provided by the UI. For example, the blending factor is a number between 1 to 20 that determines the likelihood that the assigned structure that was selected by brightness will be replaced with the one after or before it in the knit-structure series. If the blend-factor number is high, the knit zones will be distinct, with clear borders between them. If the blend-factor number is low, there will be a gradual transition between the zones until they are completely blended.

Figure 6A:
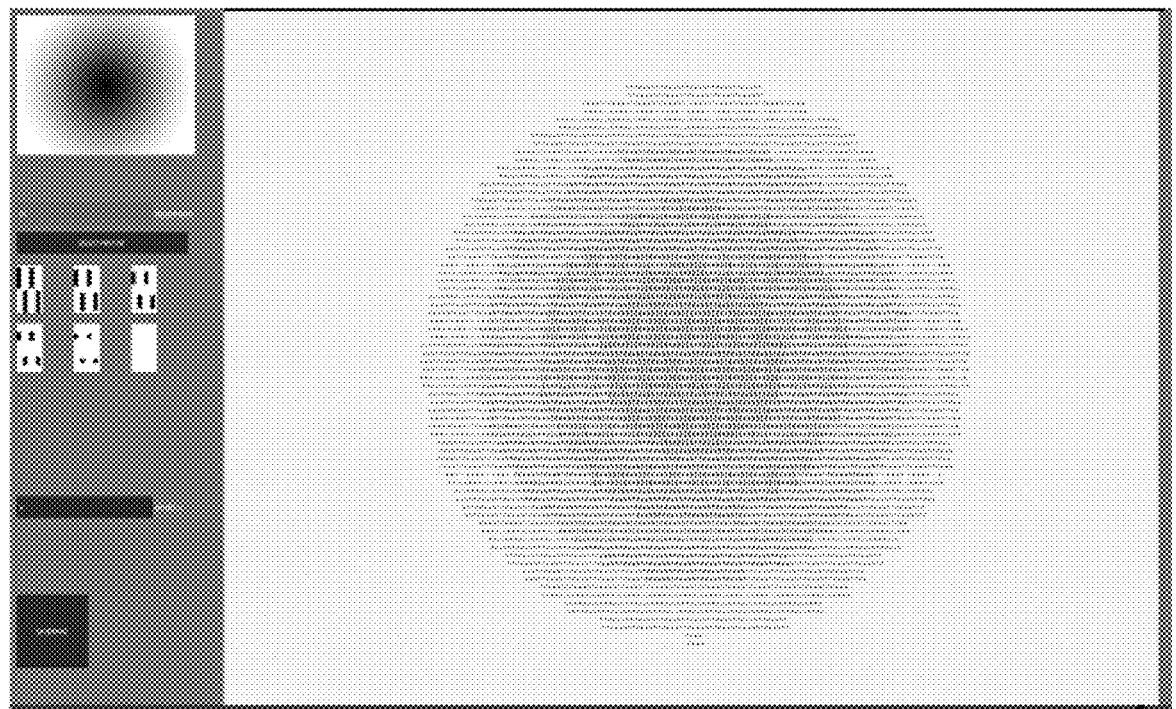
FIG. 6A and FIG. 6B are illustrations of an input image and an output image (or a processed image), respectively, demonstrating a blend effect or a blur effect for knitted clothing articles, in accordance with some demonstrative embodiments.
Figure 6B:
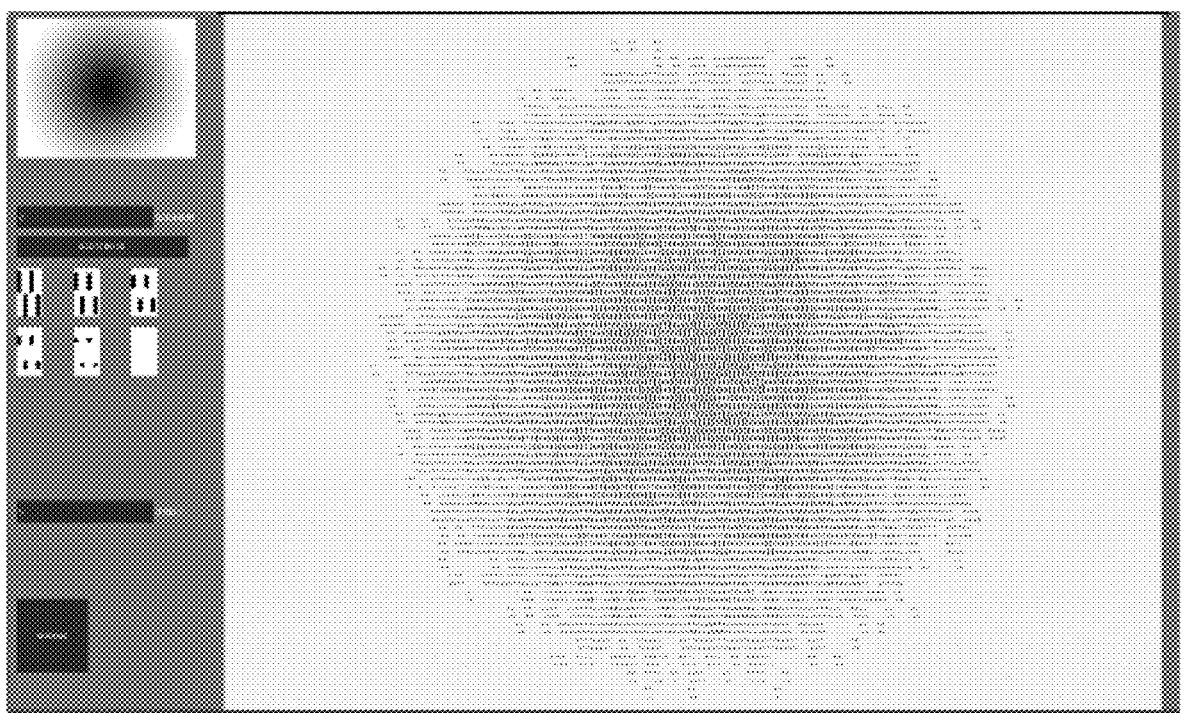

Reference is made to FIG. 6A and FIG. 6B, which are illustrations of an input image 601 and an output image (or a processed image) 602, respectively, demonstrating a blend effect or a blur effect for knitted articles, in accordance with some demonstrative embodiments. For example, image 601 is an input image that is imported into the design tool (or, that is created directly on the design tool by a designer), and brightness/darkness values are assigned to the knit blocks. Image 602 demonstrates the output, which is blurred by the blend factor, thereby creating a gradual transition between knit structures.

Some embodiments may produce or an ensure a "Knit-Proof" Output. The Applicants have realized that when using a knitting design tool, the system cannot blindly utilize a "paint bucket," which produces knitting structures that appear as color-coded pixels that are later translated into needle instructions. For example, realized the Applicants, a black pixel may indicate a "miss" knitting command, which means that the needle should stay low and there will be no knitting loop at that specific location on the fabric. However, there are design rules and/or knitting rules that should be applied regarding the location and/or proximity of these pixel-based or needle-based instructions. For example, a long row of "miss" pixels may create a stringing effect on the back side of the fabric. Other combinations may appear legitimate but may cause knitting needles to break. Wen zones are filled with knitting structures, the pixel combinations on the borderlines between the zones may cause problems with the knitting. The knitting design tool is configured to inspect bitmap images before knitting to ensure that there are no such problems, and to correct such problems by replacing or modifying knitting structures or knitting designs to avoid such or prevent or reduce such problems.

In some embodiments, the CD tool enables rapid iterations, with a high level of complexity. It is not practical for a knit programmer to inspect every bitmap image that the tool generates. Therefore, the operation of the CD tool takes into account knitting manufacturing constrains or constraints, to ensure that every result that the tool generates is "knittable" and is knit-proof or knit-friendly or knit-able, via an automatic circular knitting machine, and will not cause damage to the machine (or its needles) or produce a faulty textile. For example, in knit-structure series 500 of FIG. 5, there is always a yellow (or light) pixel in the last column of the matrix (e.g., the right-most column of each knit structure); and this prevents ending up with long rows of black pixels, since in some embodiments such black rows are limited or constrained to not more than three pixels.

In some embodiments, the workflow of the tool is based on a grayscale image input. The algorithms sample the brightness levels of the pixels in the input image, and then assign a knitting structure based on the level of brightness, alongside other calculations. When loading a different input image, the sampling changes, and the pattern of the output bitmap image changes accordingly. By manipulating the input image, making changes, and uploading a new version, designers may control the designs and outputs of the CD tool. This workflow allows adjusting and fine-tuning of the design before deciding on the final pattern to be knitted. Additionally, designers may create their own knit structures and knit-structure combinations by creating a series of knit-structure-block GIF files (or other type of graphic files). This gives the designers the ability to set or to modify the physical properties and/pr textures of the desired knitted textile.

The tool and its UI or GUI may be divided into two or more sections or regions. For example, on the right side, the canvas is shown, and this is where the output pixel-coded bitmap image is generated and displayed. On the left side of the UI are slider bars for changing values of parameters that affect the resulting bitmap image. The slider bars are used to control the level of randomness of the design, the blend factor of the transition between zones, and/or the number of knit structures used for creating the pattern. Another slider bar (or several such sliders) may be included and used to offset the bitmap image on the canvas (e.g., horizontally and/or vertically). Since the knitted textile is a cylinder, there is no actual seam in the fabric. However, the output image on the canvas is flat and has a seam on both ends. The offset slider allows the designer to follow the circumference of the pattern and spot errors on the seam of the output bitmap image.

Some embodiments may provide tools for Computational Tie-Dying of a shirt or other garment or clothing article. Conventional Tie-dying is a method for creating patterns on textiles using dyes. The process of tie-dying has remained the same for hundreds of years: textile pieces are twisted, folded, stretched, crumpled, or tied, and then dyed. After several washes, the textile is returned to its previous shape and the pattern is revealed. The process in manual, and even in today's tie-dye factories it is extremely labor-intensive. There is almost no automation involved, as the textiles are usually manipulated and dyed manually. The process uses a significant amount of water, and produces contaminated wastewater that may negatively affect the environment. There is also a logistic problem, since textile products are transferred or shipped from the knitting factory to the tie-dye factory. Usually, these are two separate factories that are not necessarily close to each other. The extensive water usage, the amount of contaminated wastewater, the shipping, and the labor required, makes the conventional tie-dye process highly unsustainable and polluting. Moreover, recently, tie-dye patterns have become a trend in the fashion world, and the demand for tie-dyed apparel has increased. This makes the sustainability problem even greater, realized the Applicants.

With the CD tool of some embodiments, it is possible to create similar tie-dye visual patterns by manipulating or modifying knit structures, without going through the polluting labor-intensive process of traditional dying. The ability of the design tool to create gradual transitions of color and a large variety of tonal colors, along with the ability to use any input image, allows to create tie-dye-like knit patterns. The patterns are created during the knitting, and there is no post-process of tying or manipulation of the textiles.

Figure 7A:
FIG. 7A is an illustration of a knitted shirt having a knitted pattern that simulates or emulates or mimics the appearance of a tie-dye shirt, in accordance with some embodiments.
Figure 7B:
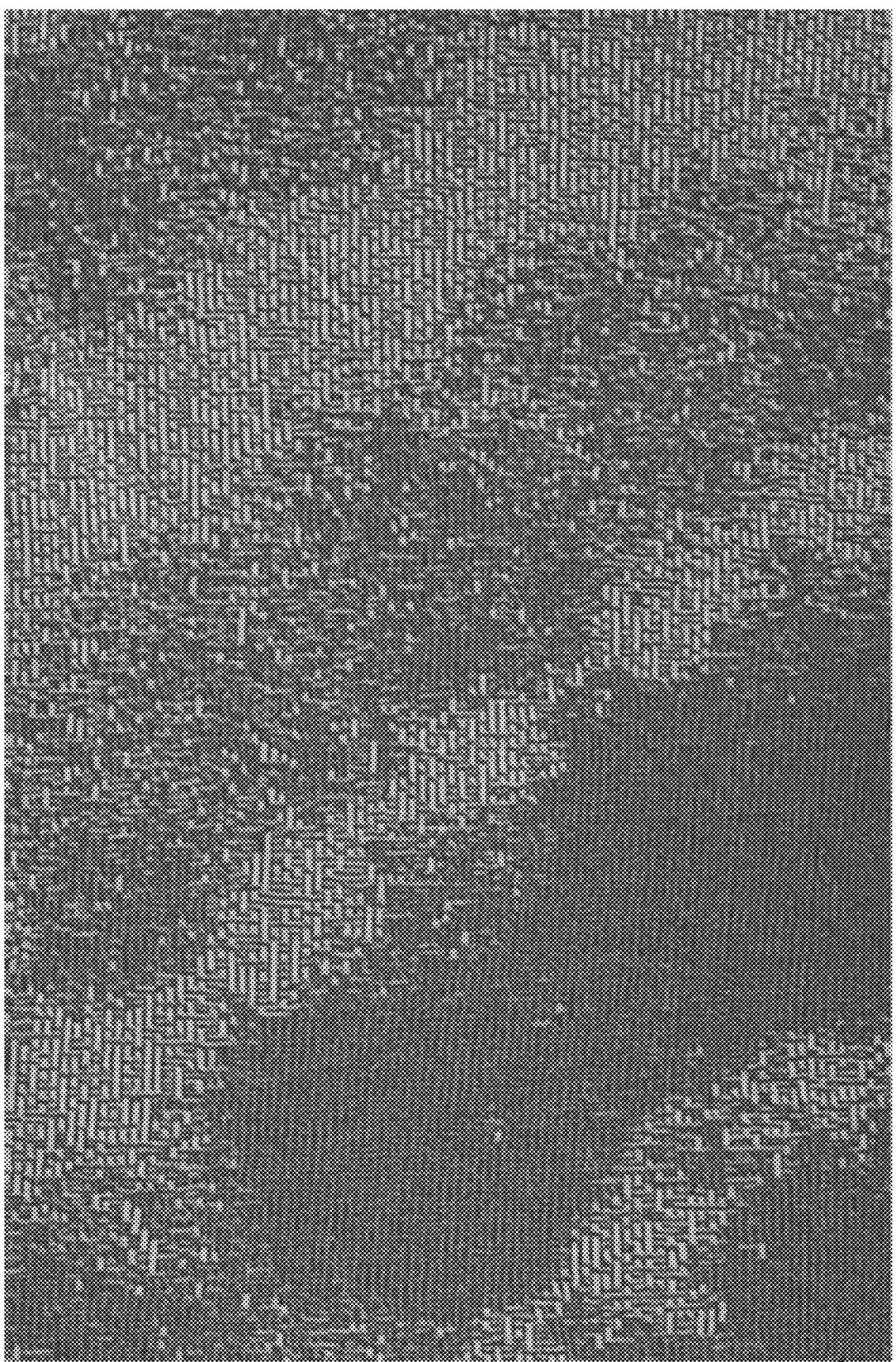
FIG. 7B is an illustration of a zoomed-in portion of the shirt of FIG. 7A, showing an enlarged view of the knit structures that form a tie-dye resembling knitted pattern, in accordance with some embodiments.

Reference is made to FIG. 7A, which is an illustration 701 of a knitted shirt having a knitted pattern that simulates or emulates or mimics the appearance of a tie-dye shirt, in accordance with some embodiments. The shirt shown in FIG. 7A is an actually-knitted shirt, that did undergo the steps of a conventional tie-dye process; namely, the shirt was not firstly knitted and was then tied (or crumbled) while being soaked in liquid paints. Rather, the short shown in FIG. 7A was knitted using the CD tools of some embodiments, which produce a knitting pattern that looks identical or almost-identical to a conventional tie-dye shirt. Reference is also made to FIG. 7B, which is an illustration 702 of a zoomed-in portion of the shirt of FIG. 7A, showing an enlarged view of the knit structures that form the tie-dye resembling knitted pattern, in accordance with some embodiments.

In accordance with some embodiments, computational tie-dye uses a knitting method in which the knitting machine uses two colors of yarn, or uses two yarns having two different colors. The knitting machine knits alternating rows of colors, using one color for the even rows and another color for the odd rows. When a "miss" structure is used in an even row, the knitting machine does not create a knit stitch at that point; and as a result, the color used in the odd rows protrudes from the fabric and interrupts the pattern. If a "miss" structure is used in an odd row, the color used in the even rows protrudes. If there are several "miss" structures one after the other, the protruding color becomes more dominant. By selectively creating "miss" structures that are represented as black pixels on the bitmap image, it is possible to create gradual color changes, and/or gradual transitions between color tones, and/or organic and unique patterns that are achieved only by the pixel-by-pixel design and the matching needle-by-needle knitting, without the need to soak a garment into painting liquids.

The CD tool may designate black pixels computationally, to achieve the requested knitting result. For example, "Miss" structures are arranged within structure blocks. The width and height of these blocks are controlled by modifiable on-screen sliders (or other GUI elements). Some embodiments for producing a tie-dye looking knitted garment, should always use an odd number of structure blocks; wherein the middle structure block is a blank block with no black pixels. This means that all the pixels will be knitted with a single knit stitch, and the pattern for this block will be a row of two alternating colors. Except for the middle structure block, half of the structure blocks have miss pixels in the odd rows, and the other half of the structure blocks have miss pixels in the even rows; with the number of black pixels decreasing as the structure block is closer to the middle.

Reference is made to FIG. 8, which is a schematic illustration of a set or series 800 of knit structures for the CD tool, which may be used for knitting a garment having a tie-dye resembling knit pattern, in accordance with some demonstrative embodiments. For example, a series of nine knit structures or knit blocks are shown, each one being a matrix of 4 (width) by 8 (height) pixels. The knit structures on the left side of the series incorporate "miss" stitches into the odd rows; whereas the knit structures on the right side of the series incorporate "miss" stitches into the even rows.

Optionally, the tool may further provide a "simulation mode" or a "preview mode", which the designer may create and view on the screen a visual simulation of the design based on colors that the designer selects. The tool automatically finds the dominant color in each row and displays it. The tool may further provide a "knitting mode", which generates the bitmap output that is then fed into the knitting machine and is used in the actual knitting.

Figure 9A:
FIG. 9A is an illustration of a "simulation mode" (or preview mode) screen, in accordance with some demonstrative embodiments.
Figure 9B:
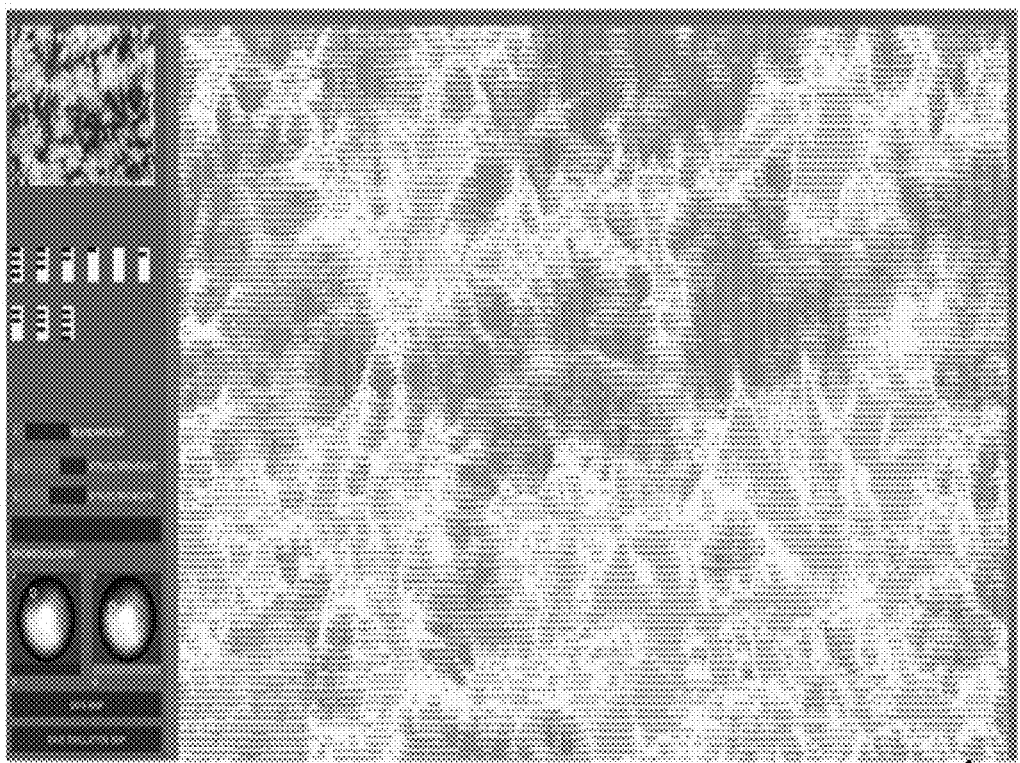
FIG. 9B is an illustration of a "knitting mode" screen, in accordance with some demonstrative embodiments.

Reference is made to FIG. 9A, which is an illustration 901 of a "simulation mode" (or preview mode) screen, in accordance with some demonstrative embodiments; and to FIG. 9B, which is an illustration 902 of a "knitting mode" screen, in accordance with some demonstrative embodiments. The simulation mode or the preview mode shows the actual color or shade(s) or gradients and they would actually appear in the knitted garment; whereas the knitting mode shows a dual-color (e.g., black and yellow) representation of pixels of the bitmap knitting scheme.

The computational digital tie-dying emulation process generates patterns that resemble or mimic traditional tie-dying. The pattern looks smooth and blended (e.g., from a distance, or by viewed by a person standing 2 or 3 meters away from the wearer, as demonstrated in FIG. 7A); a closer inspection or a close-up observation may show the needle-by-needle or the pixel-by-pixel knitted structure (e.g., as demonstrated in FIG. 7B). In contrast with conventional tie-dying, in which the yarns are dyed (painted) in the tie-dye process, in computational tie-dying emulation the separation between different-colored yarn may be noticeable; which, in turn, may actually provide a distinct and unique look or appearance to the computational tie-dye result garment. In some embodiments, the computational tie-dying emulation process is more efficiently operable when two colors are used (e.g., dark blue and light blue; or, red and pink; or other pairs of colors). In other embodiments, the CD tool may be programmed or re-configured to support more than two colors of yarns (e.g., three colors; four colors), such as, using Red Green Blue (RGB) color scheme or other color scheme, thereby increasing the variety of tie-dye effects that can be digitally computed and knitted. In some embodiments, the computational tie-dye emulation process is sustainable and water-saving and is less polluting (and more environment friendly) relative to conventional tie-dye processes. In some embodiments, optionally, dope-dyed yarns may be used, created by adding a masterbatch colorant to the polymer melt in the yarn-spinning process; or other types of color yarns or colored yarns may be used.

In some embodiments, the CD tool may be used for generating Gradual Transition Between Compression Structures. The Applicants have realized that one of the differences between circular knitting machines and flatbed knitting machines is that circular knitting machines are limited in their capability to produce fabrics in any shape other than a straight cylinder. The cam of the flatbed machine moves from side to side, which enables it to produce a flat cloth that may take on almost any 2D shape and even 3D shapes with complex geometries. This is achieved by using only part of the needles when adding a row to the fabric. However, the cam of circular knitting machines moves in a spiral, such that all the needles in the circumference of the circular knitting machine must be used. As a result, the knitted cylinder fabric always has the same or about the same diameter across the entire fabric.

In accordance with some embodiments, a flexible or stretchable yarn or increased-elasticity yarn (e.g., Spandex, or Lycra, or Elastane) may be used (e.g., in addition to non-stretchable yarn, or in addition to reduced-elasticity yarn or conventional-elasticity yarn, such as a cotton yarn), to thereby create compression or compression zones or compression regions in the textile. The level of compression depends on the selected knitting structures. Each knitting structure combination affects the compression differently. By defining, assigning and applying different knitting structures via the CD tool, it is possible to control the compression in the fabric in particular zones and/or to indirectly change the diameter of the knitted fabric cylinder. This is in contrast with a conventional utilization of a circular knitting machine, in which knit structures are assigned zonally or on a per-zone basis using a "paint bucket" tool; and such conventional approach often causes problems or imperfections or abnormalities in the fabric due to an imbalance caused by proximity and overlap between highly compressed zones and zones with less compression.

Figure 10:
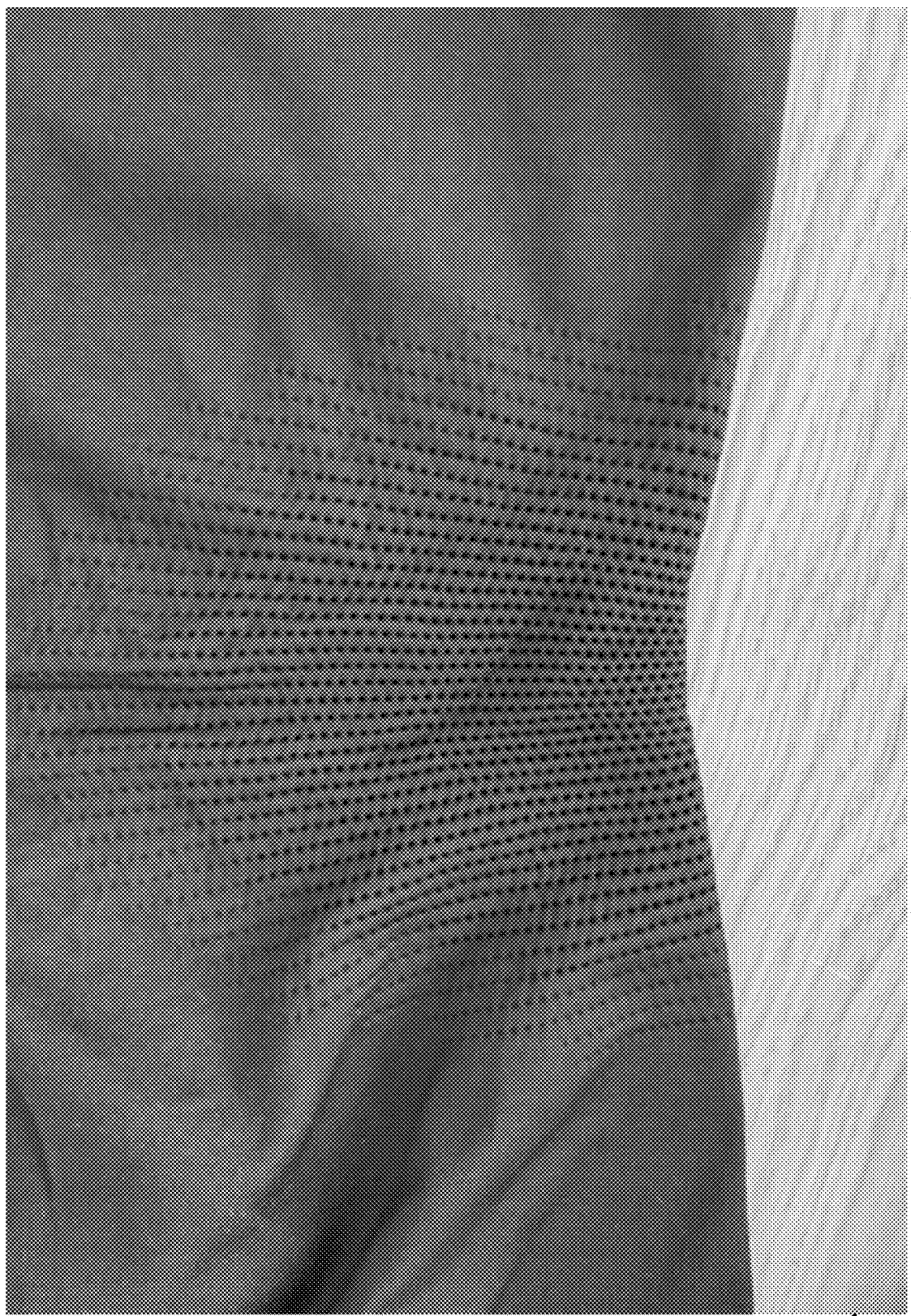
FIG. 10 is an illustration of a knitted fabric cylinder having a curved or slightly-curved silhouette or contour or edge(s), in accordance with some demonstrative embodiments.

Some embodiments may use gradual transitioning between or among knit compression structures or compression regions, which creates fabric cylinders that are curved along (or near, or adjacent to) the edge. Reference is made to FIG. 10, which is an illustration of a knitted fabric cylinder 1000 having a curved or slightly-curved silhouette or contour or edge(s), in accordance with some demonstrative embodiments. For example, an image with a radial gradient is loaded to or imported into the CD tool. The knit-structures that generate the greatest degree of compression are mapped at the center of the gradient image; and the knit structures with less compression are mapped away from the center of the gradient image. The mapping creates a smooth gradient transition of compression from the center outwardly; and as a result, the edge becomes curved or slightly-curved or partially-curved or inwardly-bent. Such curved silhouettes or edges may be used to create seamless garments that follow the curves of the body, as in a dress or compression shapewear or compression underwear or compression undergarments.

Figure 11A:
FIG. 11A is an illustration of a portion of a garment generated using random or partially-random digital knitting process, in accordance with some embodiments.
Figure 11B:
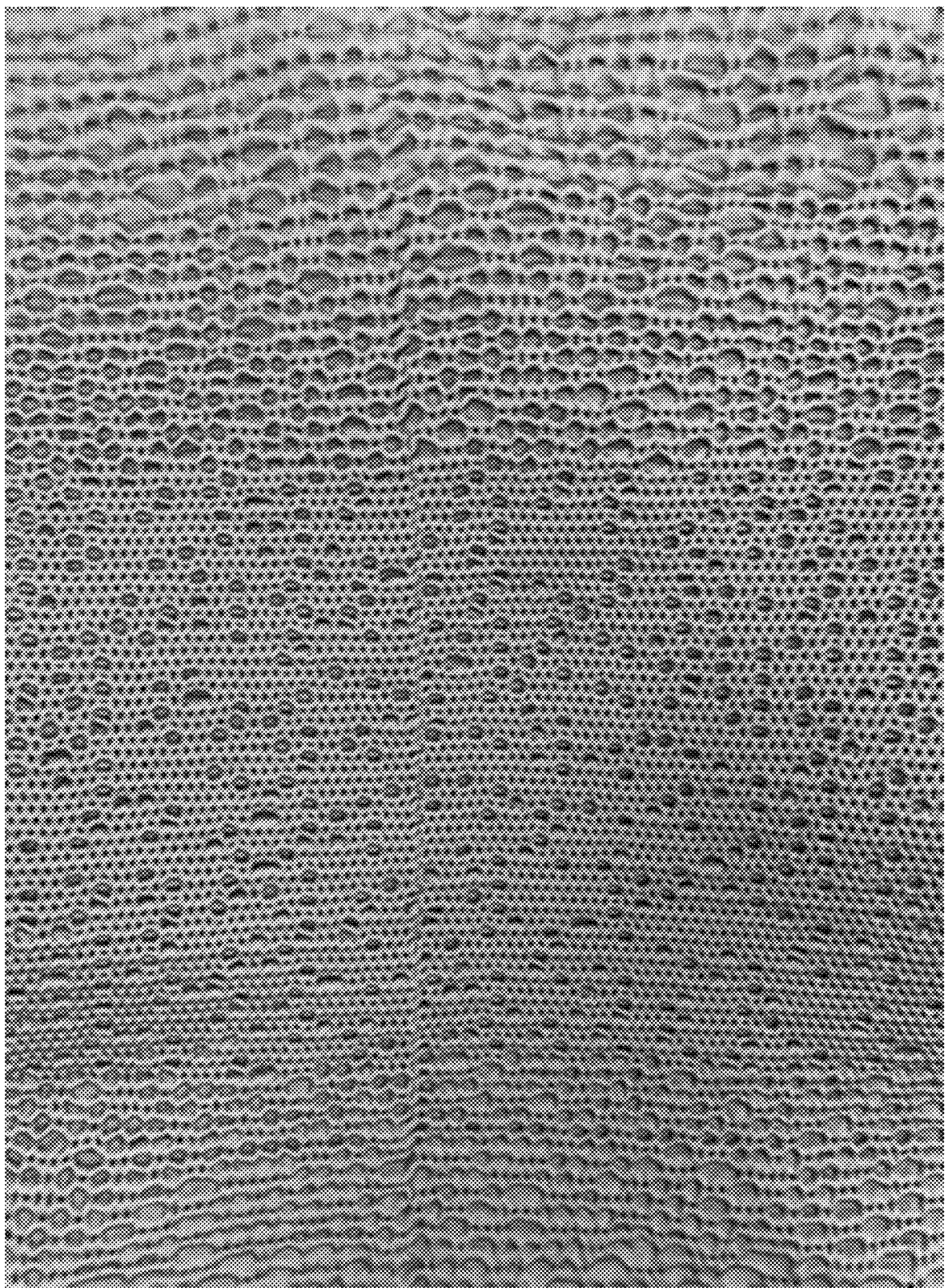
FIG. 11B is an illustration of a zoomed-out portion of a garment, demonstrating the pseudo-random portions of digitally-knitted yarns, in accordance with some embodiments.

In some embodiments, the CD tool may generate random or pseudo-random or semi-random knitted structures or knitted designs, as well as organic or unique knitting designs or knitting structures. The Applicants have realized that a limitation of conventional design tools for seamless knitting is the zonal or zone-based approach; which may sometimes result in knitted garments that appear outdated or old-fashioned or non-appealing. In contrast, some embodiments provide a CD tool which is an alternative to the conventional zonal approach. For example, the knit structures in some embodiments are assigned based on an input image and/or by using an algorithm that shuffles the knit structures (e.g., from iteration to iteration, or from row to row). Organic and unique knitting designs and knitting structures, which may be based on random or partially-random assignment (or shuffling) of knit structures, may be used to result in a fabric or a garment that is highly complex and rich in its texture, colors, knitting structure and/or tones. Reference is made to FIG. 11A, which is an illustration of a portion of a garment 1101 generated using such random or partially-random digital knitting process, in accordance with some embodiments; for example, showing a portion of a bra or a sports bra knitted from a shiny smooth thread (e.g., Lurex) utilizing random or semi-random or partially-random patterns, which creates a shiny or glittering visual effect. Reference is also made to FIG. 11B, which is an illustration of a zoomed-out portion 1102 of such garment, demonstrating the pseudo-random portions of digitally-knitted yarns, in accordance with some embodiments.

The CD tool of some embodiments may be used by fashion and textile designers working on apparel product development. The designers may thus utilize a CD tool which allows them to explore new options and experiment with graphics, textures, and other design elements in a way that they could not do before; thereby empowering the designer to achieve new and innovative knitting designs and knitting structures. The tool allows designers to produce a large variety of iterations quickly, create visual simulations, and choose which of these will be knitted. Designers may appreciate that the CD tool gives them direct control over the knitted fabric and even helps them to better understand the technology, as they observe how changes that they make using the CD tool affect the knitted textiles.

The CD tool of some embodiments may also to be effective in grading, which is the adaption of a design to a size set or, specifically in the field of circular seamless knitting, the production of different-sized bitmap images for knitting machines with different diameters and needle counts. For example, a bitmap image with a width of 1,440 pixels should be used for a size L circular knitting machine that produces size L shirts; whereas a bitmap image with a width of 1,248 pixels should be used for a size S circular knitting machine that produces size S shirts. A conventional grading process is performed by a knit programmer and is time consuming, as it requires manual inspection of a graded bitmap image and manual pixel manipulation in case of errors. In contrast, the CD tool of some embodiments make grading as easy as resizing the input grayscale map of the design; and since the output of the machine is "knit-proof" or is knit-compatible or is knitting-machine compliant, the graded bitmap image is virtually error-free; and no manual inspections or manual pixel manipulations are needed.

In some embodiments, some knit structures may lead to knitting designs that appear to be pixelated, especially when using large structure blocks. However, this may not necessarily be a disadvantage, as it provides an opportunity to produce MINECRAFT® inspired shirts or garments.

The Applicants have realized that many industrial machines are operated by a software which, in many cases, is protected and/or encoded by the manufacturer of the machine, and the workflow and design space of the machine are limited by the software it uses. In digital fabrication machines, such as circular seamless knitting machines, it is possible in accordance with some embodiments to increase the design area beyond what is defined by the machinery software as provided by the machine manufacturer. Some embodiments provide a CD tool which may be used to create an alternative workflow for knitting machines. This workflow enables the creation of organic and/or random patterns for textile products, improves performance by creating gradual transitions between zones, and creates a sustainable alternative to polluting processes. The CD tool of some embodiments enables designers to take an integral part in the making of textile products by producing and providing the bitmap image for the knitting machines. By providing designers with advanced design tools, additional innovative solutions may be developed. For example, the CD tools may be used to simplify or to shorten processes through manufacturing constrains and algorithms, and/or enable designers to take active part in the garment making process. This improves the productivity of the development process, since less information is "lost in translation" (e.g., between a fashion designer and a knit programmer, in a conventional process). Additionally, new sustainable solutions and design possibilities may be enabled by the CD tool of some embodiments.

Some embodiments provide a system which includes: (a) a seamless circular knitting machine, comprising: (a1) a circular set of needles having a particular number (M) of needles, wherein the particular number (M) of needles is in a range of 500 to 2,500 needles (or, in the range of 500 to 2,000 needles; or, in the range of 500 to 3,000 needles; or, in the range of 300 to 3,000 needles), wherein said needles are arranged in a circular pattern; and (a2) a knit controller, configured to selectively and separately operate each one of said M needles, on a needle-by-needle basis. The system further includes: a digital computational design tool, implemented by one or more hardware processors that are configured to execute code, wherein the one or more hardware processors are operably associated with one or more memory units to store code. The one or more hardware processors are configured to receive a bitmap image, having a pixel width resolution that is identical to said particular number (M) of needles; and based on processing of said bitmap image, to generate and to send knitting instructions to the knit controller of the seamless circular knitting machine, based on a direct one-to-one correlation between (I) a particular Nth pixel in a particular Rth row of said bitmap image, and (II) needle activity of a corresponding particular Nth needle out of said M needles when said Nth needle knits in the Rth row of a knitted product. For example, the seamless circular knitting machine may have 1,300 needles arranged as a circle; and the bitmap image thus has exactly 1,300 pixels per row. A particular needle out of the M needles (e.g., out of the 1,300 needles, in that example) is designated by the one or more processor as the First needle (needle number 1), and a particular direction (e.g., clock-wise) is designated as the incremental direction, such that the needle that is immediately clock-wise relative to that First needle is needle number 2, and the needle that is immediately clock-wise relative to needle number 2 is needle number 3, and so forth until needle number M (namely, needle number 1,300 in that example). Accordingly, when knitting a particular row (the Rth row) in a garment or a clothing article or a knitted product, the first pixel in that Rth row of the bitmap image indicates a knitting command to the First needle (needle number 1) when it knits that particular Rth row; and the second pixel in that Rth row of the bitmap image indicates a knitting command to the second needle (needle number 2) when it knits that particular Rth row; and so forth.

In some embodiments, the clockwise direction of needles is designated as the incremental direction of their respective order or sequential number, for the purpose of matching at a one-to-one correlation or correspondence to the pixels of the bitmap image. In some embodiments, the left-most pixel in a particular row of the bitmap image is designated as the First Pixel in that row; and the pixel that is immediately to the right of that pixel is the Second Pixel in that row; and so forth, such that the left-to-right direction is the incremental direction of sequential numbering of pixels.

In other embodiments, the counter-clockwise direction of needles is designated as the incremental direction of their respective order or sequential number, for the purpose of matching at a one-to-one correlation or correspondence to the pixels of the bitmap image. In some embodiments, the left-most pixel in a particular row of the bitmap image is designated as the First Pixel in that row; and the pixel that is immediately to the right of that pixel is the Second Pixel in that row; and so forth, such that the left-to-right direction is the incremental direction of sequential numbering of pixels.

In other embodiments, the clockwise direction of needles is designated as the incremental direction of their respective order or sequential number, for the purpose of matching at a one-to-one correlation or correspondence to the pixels of the bitmap image. In some embodiments, the right-most pixel in a particular row of the bitmap image is designated as the First Pixel in that row; and the pixel that is immediately to the left of that pixel is the Second Pixel in that row; and so forth, such that the right-to-left direction is the incremental direction of sequential numbering of pixels.

In other embodiments, the counter-clockwise direction of needles is designated as the incremental direction of their respective order or sequential number, for the purpose of matching at a one-to-one correlation or correspondence to the pixels of the bitmap image. In some embodiments, the right-most pixel in a particular row of the bitmap image is designated as the First Pixel in that row; and the pixel that is immediately to the left of that pixel is the Second Pixel in that row; and so forth, such that the right-to-left direction is the incremental direction of sequential numbering of pixels.

In some embodiments, the bitmap image is a dual-color or bi-color image, such that each pixel in that bitmap image may have either a value of 1 or a value of 0 (e.g., rather than having 256 possible values per pixel, or other number of possible values). In some embodiments, a pixel value of "1" indicates a Knit command to the corresponding needle at that row; and a pixel value of "0" indicates a Miss command or a Skip command to the corresponding needle at that row.

In some embodiments, in the digital computational design tool, the one or more hardware processors are further configured: to generate said bitmap image which represents, via a pixel-by-pixel bitmap content, a corresponding needle-by-needle knitting pattern that emulates a tie-dye visual effect. The digital computational design tool provides to the knit controller of said seamless circular knitting machine, based on said bitmap image, needle-by-needle knitting instructions that cause said seamless circular knitting machine to knit a garment having said tie-dye visual effect. The visual tie-dye effect is exclusively a knitted effect, and lacks a post-knitting colorization processes or dyeing processes or tie-and-dye or tie-and-dip processes in which an entirety (or a portion) of the knitted garment is soaked or dipped in a liquid colorant. The visual tie-dye effect of the garment is achieved only via selective pixel-by-pixel or needle-by-needle knitting, such that the knit-or-miss (or, the knit-or-skip) knitting structure or knitting instructions cause the garment to have the visual tie-dye effect, without a soaking or a dipping of the garment (or portions thereof) in a liquid colorant post-knitting; and the gradual transition between colors or shades is provided exclusively via such knitting effects or knit-or-miss knitting structure or knit-or-skip knitting structure.

In some embodiments, the digital computational design tool generates said bitmap image which has exactly two colors, which are a first color and a second color. A pixel in said bitmap image, having said first color, located at an offset of P pixels from a start of a row of pixels, indicates a knitting instruction to knit a stitch by a particular needle which has an offset of P needles from a first needle that indicates a start of a circle of needles. A pixel in said bitmap image, having said second color, located at an offset of K pixels from a start of a row of pixels, indicates a knitting instruction to miss or to skip stitch by a particular needle which has an offset of K needles from a first needle that indicates a start of a circle of needles. An "offset" means the sequential number of that Pixel from the beginning of that row (e.g., from the left-most edge or that row); for example, an offset of "1" indicates the first, left-most, pixel in a row; an offset of "34" indicates the 34th pixel in that row when starting to count from the left side to the right side; and so forth.

In some embodiments, the one or more processors are configured to modify a level of randomness of alternating between the first color and the second color, in response to a user command which indicates a user-selected level of randomness that said user assigns to a particular tie-dye visual effect for said knitted product. For example, a Random Number Generator (RNG) or a Pseudo-Random Number Generator (PRNG) may be used by the processor(s), and the range from which a random or pseudo-random number is selected may be modified or set by the processor(s) in order to match a level of randomness or a level of entropy that is indicated to the system via a GUI element (e.g., a slider, a drop-down menu, an on-screen knob, or the like).

In some embodiments, the one or more processors are configured to import and process an input bitmap image which depicts an emulated tie-dye visual effect, and to generate from it an output dual-color bitmap image, wherein pixel-by-pixel color variations in said dual-color bitmap image correspond to needle-by-needle knitting instructions (e.g., knit-or-skip on a per-needle/per-pixel basis; or, knit-or-skip on a per-needle/per-pixel basis) of said needles of said seamless circular knitting machine.

In some embodiments, in the digital computational design tool, the one or more hardware processors are further configured: to generate said bitmap image which is a dual-color bitmap image, wherein each pixel in said dual-color bitmap image has either a first color or a second color; wherein a pixel having the first color indicates a knitting instruction to knit a stitch by a corresponding needle of the seamless circular knitting machine; wherein a pixel having the second color indicates a knitting instruction to miss or to skip a stitch by a corresponding needle of the seamless circular knitting machine.

In some embodiments, in the digital computational design tool, the one or more hardware processors are further configured to provide to said knit controller a set of needle-by-needle knitting instructions that correspond to pixel-by-pixel color values of said bitmap image; wherein a color value of a pixel corresponds either to a "knit a stitch" instruction to a particular needle or to a "miss a stitch" (or, "skip a stitch") instruction to that particular needle.

In some embodiments, in the digital computational design tool, the one or more hardware processors are further configured to provide to said knit controller a set of needle-by-needle knitting instructions that correspond to pixel-by-pixel color values of said bitmap image and which cause said needles to knit a particular gradually-changing compression structure which corresponds to a visual structure depicted in said bitmap image. The resulting garment or clothing article or knitted product, for example, has circular or tubular knitted-rows or knitted-circles that have a differential diameter or that have different diameter; such that at least two or at least three or at least four neighboring or adjacent knitted tubular rows (or circles) have different diameters relative to each other; such that the garment provides or has a mechanical compression effect in that region due to the differential diameter of circular knitted portions. The compression effect is achieved, and/or the differential diameter is achieved, due to the particular knit structure (e.g., the particular structure of pixel-by-pixel instructions that correspond to needle-by-needle instructions of knit-or-miss, or knit-or-skip, or stitch-or-miss, or stitch-or-skip). The diameter of the circular arrangement of the needles remains fixed and unchanged in the knitting machine; and the number of needles that are used (M) remains fixed and unchanged, and no needles are removed from or added to the knitting machine, and no modification of the number of needles in the knitting machine is required or is used, and no modification of the diameter or the shape or the size of the circular arrangement of needles in the knitting machine is required or is performed.

In some embodiments, in the digital computational design tool, the one or more hardware processors are further configured to provide to said knit controller a set of needleby-needle knitting instructions that correspond to pixel-by-pixel color values of said bitmap image and which cause said needles to knit a particular gradually-changing compression structure which corresponds to a visual structure depicted in said bitmap image. A first particular row of pixels in the bitmap image, which has a total of P pixels, represents a first level of fabric compression due to a first knitted pattern represented by said first particular row of pixels; and causes said seamless circular knitting machine to knit a first circular (or tubular) fabric-portion (or garment-portion) that has a first level of body compression and that has a first diameter in centimeters. A second particular row of pixels in the bitmap image, which also has a total of P pixels, represents a second, different, level of fabric compression due to a second, different, knitted pattern represented by said second particular row of pixels; and causes said seamless circular knitting machine to knit a second, different, circular (or tubular) fabric-portion or garment-portion that has a second, different, level of body compression and that has a second, different, diameter in centimeters.

In some embodiments, in the digital computational design tool, the one or more hardware processors are further configured to provide to said knit controller a set of needle-by-needle knitting instructions that correspond to pixel-by-pixel color values of said bitmap image and which cause said needles to differentially knit different circular portions of a same garment, and which cause the seamless circular knitting machine to automatically produce a generally tubular fabric having a plurality of different diameter values for a plurality of different circumferential fabric-regions; wherein said digital computational design tool causes the same seamless circular knitting machine to knit a first tubular element having a first diameter and to also knit a second, adjacent, tubular element having a second, different, diameter; without modifying the total number of needles (M) of the knitting machine, and/or without modifying the diameter and/or size and/or shape of the circular arrangement of the M needles of the knitting machine, and/or the spacing or distance between needles.

In some embodiments, in the digital computational design tool, the one or more hardware processors are further configured: to generate said bitmap image which represents, via a pixel-by-pixel bitmap content, a corresponding needle-by-needle knitting pattern that causes emulates a tie-dye visual effect; wherein said digital computational design tool provides to the knit controller of said seamless circular knitting machine, based on said bitmap image, needle-by-needle knitting instructions that cause said seamless circular knitting machine to knit a garment having said tie-dye visual effect; wherein the color (or content) of each pixel has a binary value (e.g., 1 or 0) which indicates a per-needle knit command (e.g., knit-or-miss, or knit-or-skip, or stitch-or-miss, or stitch-or-skip).

In some embodiments, in the digital computational design tool, the one or more hardware processors are further configured: to generate an on-screen Graphic User Interface (GUI) element (e.g., on-screen slider, on-screen rotatable knob, on-screen drop-down menu, on-screen GUI elements for selecting and/or modifying a value within a range-of-values) that enables a user to set and/or to select and/or to modify an attribute of a content of said bitmap image; to detect a user command, via said on-screen GUI element, requesting a modification of said attribute of the content of said bitmap image; and in response to detecting said user command, to perform said modification of said attribute, and to generate an updated version of said bitmap image which represents and updated version of said knitted product.

In some embodiments, the one or more hardware processors are further configured to modify a level of randomness of a blended knitting pattern, by randomly modifying and/or randomly increasing and/or randomly decreasing a distance between pixels of a same color in said bitmap image. For example a particular row of pixels may have originally a set of pixel-values of "1001000100001" (note the differences of two-zeros and then three-zeros and then four-zeros between neighboring pairs of Ones); and based on the requested attribute modification, a modified row of pixels is generated by the processor to have pixel-values of "1000010000001" by increasing the distance between One values, and/or by decreasing the number of One values, to thereby modify the resulting visual effect. In another example, the modified set of pixels may be "110011000111000", such that each One value is changed to a pair of neighboring One values. Other suitable modifications may be generated, for example, based on pre-defined rules that correlate between (I) a user-requested type of modification as entered by the user via the on-screen GUI element(s), and (II) the automatic modification that the processor(s) perform to the original (or pre-modification) set of pixels. For example, a first pre-defined rule may be, that a user command to increase the gradual transition between shades or between colors, may be processed by inserting one or more additional "0" values (or conversely, "1" values in some embodiments) in a particular row of pixels, and/or by modifying the distance between neighboring One values (or, between neighboring Zero values, in some embodiments), and/or by inserting an additional One value immediately after an existing One value, and/or other suitable pre-defined rules that correspond to particular user-requested modifications.

In some embodiments, the one or more hardware processors are further configured to modify a level of randomness (or a level of entropy) of a blended knitting pattern, by shuffling an order of knit structures that are used within said bitmap image. For example, a set or a series of knit structures may be defined and may be utilized, as demonstrated above and/or in the drawings that show demonstrative knit structures; and the processor(s) may automatically shuffle or re-order a series of knit structures from row to row in the bitmap image, and/or within the same row as a series of knit structures is repeated or re-used within a particular row. For example, in some embodiments, the processor(s) may take a knit structure having 9 rectangular elements; may use it firstly as it is (original order); and may then swap the second and the eighth rectangular elements for a first repetition of utilizing that knit structure; and may then swap the third and the sixth rectangular elements for a second repetition of utilizing that knit structure; and so forth, in accordance with one or more pre-defined shuffling rules and/or re-ordering rules and/or knit structure modification rules and/or knit elements swapping rules or switching rules; and optionally utilizing a random or pseudo-random selection process for such modification (e.g., the processor(s) may swap, in a series of 9 rectangular elements of knit structures, between: a rectangular element selected randomly from the first three rectangular elements, and a rectangular element selected randomly from the last three rectangular elements). In some embodiments, the one or more hardware processors are further configured to modify a level of randomness (or level of entropy) of a blended knitting pattern, by shuffling an order of pixel blocks that represent knit structures within said bitmap image; or by switching or swapping such pixel blocks; based on pre-defined rules, and/or based on random or pseudo-random selection process.

In some embodiments, the one or more processors are configured to generate a correlation between (I) pixels arranged in a row in said bitmap image, and (II) needles arranged in a circle in said seamless circular knitting machine; by defining that a particular needle out of the M needles of the seamless circular knitting machine is the needle which corresponds to the first pixel in each row of said bitmap image; wherein said correlation between said pixels and said needles enables said knit controller to generate knitting instructions that emulate or simulate or mimic a visual effect defined by said bitmap image.

In some embodiments, the one or more processors are configured to generate said bitmap image having pixels which represent needle-by-needle instructions, represented on a single-pixel-per-single-needle basis; wherein a row of pixels in said bitmap image, corresponds to a knitted circumferential tubular portion of a single knitted garment.

In some embodiments, the one or more processors are configured to generate said bitmap image having pixels which represent needle-by-needle instructions, represented on a single-pixel-per-single-needle basis; and are further configured to generate needle-by-needle knitting instructions that cause the needles of said seamless circular knitting machine to knit a garment having a knitted effect that mimics a tie-dye visual effect.

Some embodiments provide a method that includes: (a) providing a seamless circular knitting machine, which comprises: (a1) a circular set of needles having a particular number of needles (M), wherein the particular number of needles is in range of 500 to 2,000 needles, wherein said needles are arranged in a circular pattern; and (a2) a knit controller, configured to selectively operate each one of said M needles, on a needle-by-needle basis. The method further includes: (b) in a digital computational design tool, implemented by one or more hardware processors that are operably associated with one or more memory units, receiving a bitmap image, having a pixel width resolution that is identical to said particular number (M) of needles; and based on analysis of said bitmap image, generating and sending knitting instructions to the knit controller of the seamless circular knitting machine, based on direct correlation between (I) a particular Nth pixel in a particular Rth row of said bitmap image, and (II) needle activity of a corresponding particular Nth needle out of said M needles when said Nth needle knits in the Rth row of a knitted product.

Some embodiments include a knitted garment, comprising: a particular garment-region having a tie-dye-mimicking effect, formed exclusively via a knitting structure in which some particular points of the garment-region have a knitting stitch and other particular points of the garment-region lack knitting stitches; wherein said tie-dye-mimicking effect comprises gradual transition between a first color shade to a second color shade based on differential spacing among (i) knitted points that have knitting stitches, and (ii) knitted points that lack knitting stitches; wherein said knitted garment, and said particular garment-region having said tie-dye-mimicking effect, lack any post-knitting colored yarns or any yarns that were subject to post-knitting colorization; wherein said knitted garment, and said particular garment-region having said tie-dye-mimicking effect, lack any fabric portion that was subject to any post-knitting dip (or any post-knitting dipping, or any post-knitting tying or tie, or any post-knitting folding or fold, or any post-knitting treat or treatment, or any post-knitting soaking or soak) in any liquid colorization agent.

Some embodiments include a knitted garment, comprising: a particular garment-region having a differential level of circumferential compression, formed exclusively via a differential knitting structure in which some particular points of the garment-region have a knitting stitch and other particular points of the garment-region lack knitting stitches; wherein, due to said differential knitting structure, a plurality of different tubular portions of said garment-region having a corresponding plurality of different diameters; wherein each one of said tubular portions has a same number of knitting points; wherein said tubular portions differ from each other by (i) a number of knitted stitch points, and also by (ii) a number of missed or skipped or non-stitched knitting points, and also by (iii) an order of arrangement of the knitted stitch points and the non-stitched knitting points.

In some embodiments, an apparatus includes a digital computational design tool, implemented by one or more hardware processors that are configured to execute code, wherein the one or more hardware processors are operably associated with one or more memory units to store code. The digital computational design tool is in communication, via a wired communication link or a wireless communication link, with a seamless circular knitting machine; which in turn comprises: (a1) a circular set of needles having a particular number (M) of needles, wherein the particular number (M) of needles is in a range of 500 to 2,500 needles, wherein said needles are arranged in a circular pattern; and (a2) a knit controller, configured to selectively and separately operate each one of said M needles, on a needle-by-needle basis. The one or more hardware processors of the digital computational design tool are configured to receive a bitmap image, having a pixel width resolution that is identical to said particular number (M) of needles; and based on processing of said bitmap image, to generate and to send knitting instructions to the knit controller of the seamless circular knitting machine, based on a direct one-to-one correlation between (I) a particular Nth pixel in a particular Rth row of said bitmap image, and (II) needle activity of a corresponding particular Nth needle out of said M needles when said Nth needle knits in the Rth row of a knitted product.

Parameters or values that are mentioned above or herein, indicated by a letter (e.g., "M" or "N" or "R", or the like), may be a pre-defined or pre-configured value or natural number or positive integer; or may be a hard-coded value or integer number or positive integer; or may be a user-modifiable number or value. For example, M is a positive integer; N is a sequential number of a pixel in a row, which also corresponds to a sequential number of a needle of said M needles; R in a sequential number of a row in the bitmap image and in a corresponding knitted row of said knitted product.

Some embodiments of the present invention may be implemented by using a machine or an automated or semi-automatic production line, which may comprise, for example: cutting unit, welding unit, bonding unit, ultrasonic operations unit, gluing unit, conveyor belt, robotic arm, control unit, workstation; as well as suitable hardware components and/or software components, for example, processor to execute code, memory unit, storage unit, input unit (keyboard, mouse, touch-screen), output unit (screen, touch-screen), modems, transceivers or transmitters or receivers, wireless and/or wired communication links and/or transceivers or transmitters or receivers, power sources, Operating System (OS) and suitable applications, or the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the claims are intended to cover all such modifications, substitutions, changes, and equivalents.

The invention claimed is:

1. A system comprising:
   (a) a seamless circular knitting machine, comprising:
   (a1) a circular set of needles having an M number of needles, wherein the M number of needles is in a range of 500 to 2,500 needles, wherein said needles are arranged in a circular pattern; and
   (a2) a knit controller, configured to selectively and separately operate each one of said M needles, on a needle-by-needle basis;
   and
   (b) a digital computational design tool, implemented by one or more hardware processors that are configured to execute code, wherein the one or more hardware processors are operably associated with one or more memory units to store the code;
   wherein the one or more hardware processors are configured to receive a bitmap image, having a pixel width resolution that is identical to said M number of needles;
   and based on processing of said bitmap image, to generate and to send knitting instructions to the knit controller of the seamless circular knitting machine, based on a direct one-to-one correlation between (I) an Nth pixel in an Rth row of said bitmap image, and (II) needle activity of a corresponding Nth needle out of said M needles when said Nth needle knits in the Rth row of a knitted product;
   wherein the one or more hardware processors are further configured to modify a level of randomness of a blended knitting pattern of said knitted product, by performing an operation selected from the group consisting of: (i) randomly modifying a distance between pixels of a same color in said bitmap image; (ii) shuffling an order of knit structures that are used within said bitmap image; (iii) shuffling an order of pixel blocks that represent knit structures within said bitmap image.

2. The system of claim 1,
   wherein in the digital computational design tool, the one or more hardware processors are further configured:
   to generate said bitmap image which represents, via a pixel-by-pixel bitmap content, a corresponding needle-by-needle knitting pattern that emulates a tie-dye visual effect;
   wherein said digital computational design tool provides to the knit controller of said seamless circular knitting machine, based on said bitmap image, the knitting instructions that are needle-by-needle and that cause said seamless circular knitting machine to knit a garment of the knitted product that emulates said tie-dye visual effect.

3. The system of claim 1,
   wherein the one or more processors are configured to generate a correlation between
   (I) pixels arranged in a row in said bitmap image, and
   (II) needles arranged in a circle in said seamless circular knitting machine;
   by defining that a needle out of the M needles of the seamless circular knitting machine is the needle which corresponds to the first pixel in each row of said bitmap image;
   wherein said correlation between said pixels and said needles enables said knit controller to generate the knitting instructions that emulate a visual effect defined by said bitmap image.

4. The system of claim 1,
   wherein the one or more processors are configured to generate said bitmap image having pixels which represent the knitting instructions that are needle-by-needle and are represented on a single-pixel-per-single-needle basis;
   wherein a row of pixels in said bitmap image corresponds to a knitted circumferential tubular portion of a single knitted garment of the knitted product.

5. The system of claim 1,
   wherein the one or more processors are configured to generate said bitmap image having pixels which represent the knitting instructions that are needle-by-needle and are represented on a single-pixel-per-single-needle basis;
   and are further configured to generate the knitting instructions that are needle-by-needle and that cause the needles of said seamless circular knitting machine to knit a garment of the knitted product having a knitted effect that mimics a tie-dye visual effect.

6. A system comprising:
   (a) a seamless circular knitting machine, comprising:
   (a1) a circular set of needles having an M number of needles, wherein the M number of needles is in a range of 500 to 2,500 needles, wherein said needles are arranged in a circular pattern; and
   (a2) a knit controller, configured to selectively and separately operate each one of said M needles, on a needle-by-needle basis;
   and
   (b) a digital computational design tool, implemented by one or more hardware processors that are configured to execute code, wherein the one or more hardware processors are operably associated with one or more memory units to store the code;
   wherein the one or more hardware processors are configured to receive a bitmap image, having a pixel width resolution that is identical to said M number of needles; and based on processing of said bitmap image, to generate and to send knitting instructions to the knit controller of the seamless circular knitting machine, based on a direct one-to-one correlation between (I) an Nth pixel in an Rth row of said bitmap image, and (II) needle activity of a corresponding Nth needle out of said M needles when said Nth needle knits in the Rth row of a knitted product;
   wherein said digital computational design tool generates said bitmap image which has exactly two colors, which are a first color and a second color;
   wherein a pixel in said bitmap image, having said first color, located at an offset of P pixels from a start of a row of pixels, indicates a knitting instruction of the knitting instructions to knit a stitch by a needle which has an offset of P needles from a first needle that indicates a start of a circle of needles;
   wherein a pixel in said bitmap image, having said second color, located at an offset of K pixels from a start of a row of pixels, indicates a knitting instruction of the knitting instructions to miss or to skip a stitch by a needle which has an offset of K needles from the first needle that indicates the start of the circle of needles.

7. The system of claim 6,
wherein the one or more processors are configured to modify a level of randomness of alternating between the first color and the second color, in response to a user command which indicates a user-selected level of randomness that a user assigns to a tie-dye visual effect for said knitted product.

8. A system comprising: of claim 1,
(a) a seamless circular knitting machine, comprising:
(a1) a circular set of needles having an M number of needles, wherein the M number of needles is in a range of 500 to 2,500 needles, wherein said needles are arranged in a circular pattern; and
(a2) a knit controller, configured to selectively and separately operate each one of said M needles, on a needle-by-needle basis; and
(b) a digital computational design tool, implemented by one or more hardware processors that are configured to execute code, wherein the one or more hardware processors are operably associated with one or more memory units to store the code;
wherein the one or more hardware processors are configured to receive a bitmap image, having a pixel width resolution that is identical to said M number of needles; and based on processing of said bitmap image, to generate and to send knitting instructions to the knit controller of the seamless circular knitting machine, based on a direct one-to-one correlation between (I) an Nth pixel in an Rth row of said bitmap image, and (II) needle activity of a corresponding Nth needle out of said M needles when said Nth needle knits in the Rth row of a knitted product;
wherein the one or more processors are configured to import and process an input bitmap image which depicts an emulated tie-dye visual effect, and to generate from the input bitmap image an output dual-color bitmap image, wherein pixel-by-pixel color variations in said dual-color bitmap image correspond to the knitting instructions of said needles of said seamless circular knitting machine that are needle-by-needle.

9. A system comprising:
(a) a seamless circular knitting machine, comprising:
(a1) a circular set of needles having an M number of needles, wherein the M number of needles is in a range of 500 to 2,500 needles, wherein said needles are arranged in a circular pattern; and
(a2) a knit controller, configured to selectively and separately operate each one of said M needles, on a needle-by-needle basis; and
(b) a digital computational design tool, implemented by one or more hardware processors that are configured to execute code, wherein the one or more hardware processors are operably associated with one or more memory units to store the code;
wherein the one or more hardware processors are configured to receive a bitmap image, having a pixel width resolution that is identical to said M number of needles; and based on processing of said bitmap image, to generate and to send knitting instructions to the knit controller of the seamless circular knitting machine, based on a direct one-to-one correlation between (I) an Nth pixel in an Rth row of said bitmap image, and (II) needle activity of a corresponding Nth needle out of said M needles when said Nth needle knits in the Rth row of a knitted product;
wherein in the digital computational design tool, the one or more hardware processors are further configured:
to generate said bitmap image which is a dual-color bitmap image, wherein each pixel in said dual-color bitmap image has either a first color or a second color;
wherein a pixel having the first color indicates a knitting instruction of the knitting instructions to knit a stitch by a corresponding needle of the seamless circular knitting machine;
wherein a pixel having the second color indicates a knitting instruction of the knitting instructions to miss or to skip a stitch by a corresponding needle of the seamless circular knitting machine.

10. A system comprising:
(a) a seamless circular knitting machine, comprising:
(a1) a circular set of needles having an M number of needles, wherein the M number of needles is in a range of 500 to 2,500 needles, wherein said needles are arranged in a circular pattern; and
(a2) a knit controller, configured to selectively and separately operate each one of said M needles, on a needle-by-needle basis; and
(b) a digital computational design tool, implemented by one or more hardware processors that are configured to execute code, wherein the one or more hardware processors are operably associated with one or more memory units to store the code;
wherein the one or more hardware processors are configured to receive a bitmap image, having a pixel width resolution that is identical to said M number of needles; and based on processing of said bitmap image, to generate and to send knitting instructions to the knit controller of the seamless circular knitting machine, based on a direct one-to-one correlation between (I) an Nth pixel in an Rth row of said bitmap image, and (II) needle activity of a corresponding Nth needle out of said M needles when said Nth needle knits in the Rth row of a knitted product;
wherein in the digital computational design tool, the one or more hardware processors are further configured to provide to said knit controller the knitting instructions that are needle-by-needle and that correspond to pixel-by-pixel color values of said bitmap image.

11. A system comprising:
(a) a seamless circular knitting machine, comprising:
(a1) a circular set of needles having an M number of needles, wherein the M number of needles is in a range of 500 to 2,500 needles, wherein said needles are arranged in a circular pattern; and
(a2) a knit controller, configured to selectively and separately operate each one of said M needles, on a needle-by-needle basis; and
(b) a digital computational design tool, implemented by one or more hardware processors that are configured to execute code, wherein the one or more hardware processors are operably associated with one or more memory units to store the code;

wherein the one or more hardware processors are configured to receive a bitmap image, having a pixel width resolution that is identical to said M number of needles; and based on processing of said bitmap image, to generate and to send knitting instructions to the knit controller of the seamless circular knitting machine, based on a direct one-to-one correlation between (I) an Nth pixel in an Rth row of said bitmap image, and (II) needle activity of a corresponding Nth needle out of said M needles when said Nth needle knits in the Rth row of a knitted product;

wherein in the digital computational design tool, the one or more hardware processors are further configured to provide to said knit controller the knitting instructions that are needle-by-needle and that correspond to pixel-by-pixel color values of said bitmap image and which cause said needles to knit a gradually-changing compression structure which corresponds to a visual structure depicted in said bitmap image.

12. A system comprising:
(a) a seamless circular knitting machine, comprising:
(a1) a circular set of needles having an M number of needles, wherein the M number of needles is in a range of 500 to 2,500 needles, wherein said needles are arranged in a circular pattern; and
(a2) a knit controller, configured to selectively and separately operate each one of said M needles, on a needle-by-needle basis; and
(b) a digital computational design tool, implemented by one or more hardware processors that are configured to execute code, wherein the one or more hardware processors are operably associated with one or more memory units to store the code;
wherein the one or more hardware processors are configured to receive a bitmap image, having a pixel width resolution that is identical to said M number of needles; and based on processing of said bitmap image, to generate and to send knitting instructions to the knit controller of the seamless circular knitting machine, based on a direct one-to-one correlation between (I) an Nth pixel in an Rth row of said bitmap image, and (II) needle activity of a corresponding Nth needle out of said M needles when said Nth needle knits in the Rth row of a knitted product;
wherein in the digital computational design tool, the one or more hardware processors are further configured to provide to said knit controller the knitting instructions that are needle-by-needle and that correspond to pixel-by-pixel color values of said bitmap image and which cause said needles to knit a gradually-changing compression structure which corresponds to a visual structure depicted in said bitmap image,
wherein a first row of pixels in the bitmap image, which has a total of P pixels, represents a first level of fabric compression due to a first knitted pattern represented by said first row of pixels; and causes said seamless circular knitting machine to knit a first circular fabric-portion of the knitted product that has a first level of body compression and that has a first diameter in centimeters;
wherein a second row of pixels in the bitmap image, which also has a total of P pixels, represents a second, different, level of fabric compression due to a second, different, knitted pattern represented by said second row of pixels; and causes said seamless circular knitting machine to knit a second, different, circular fabric-portion of the knitted product that has a second, different, level of body compression and that has a second, different, diameter in centimeters.

13. A system comprising:
(a) a seamless circular knitting machine, comprising:
(a1) a circular set of needles having an M number of needles, wherein the M number of needles is in a range of 500 to 2,500 needles, wherein said needles are arranged in a circular pattern; and
(a2) a knit controller, configured to selectively and separately operate each one of said M needles, on a needle-by-needle basis; and
(b) a digital computational design tool, implemented by one or more hardware processors that are configured to execute code, wherein the one or more hardware processors are operably associated with one or more memory units to store the code;
wherein the one or more hardware processors are configured to receive a bitmap image, having a pixel width resolution that is identical to said M number of needles; and based on processing of said bitmap image, to generate and to send knitting instructions to the knit controller of the seamless circular knitting machine, based on a direct one-to-one correlation between (I) an Nth pixel in an Rth row of said bitmap image, and (II) needle activity of a corresponding Nth needle out of said M needles when said Nth needle knits in the Rth row of a knitted product;
wherein in the digital computational design tool, the one or more hardware processors are further configured to provide to said knit controller the knitting instructions that are needle-by-needle and that correspond to pixel-by-pixel color values of said bitmap image and which cause said needles to differentially knit different circular portions of a garment of the knitted product, and which cause the seamless circular knitting machine to automatically produce a generally tubular fabric of the knitted product having a plurality of different diameter values for a plurality of different circumferential fabric-regions;
wherein said digital computational design tool causes the same seamless circular knitting machine to knit a first tubular element of the generally tubular fabric having a first diameter and to also knit a second, adjacent, tubular element of the generally tubular fabric having a second, different, diameter.

14. A system comprising:
(a) a seamless circular knitting machine, comprising:
(a1) a circular set of needles having an M number of needles, wherein the M number of needles is in a range of 500 to 2,500 needles, wherein said needles are arranged in a circular pattern; and
(a2) a knit controller, configured to selectively and separately operate each one of said M needles, on a needle-by-needle basis; and
(b) a digital computational design tool, implemented by one or more hardware processors that are configured to execute code, wherein the one or more hardware processors are operably associated with one or more memory units to store the code;
wherein the one or more hardware processors are configured to receive a bitmap image, having a pixel width resolution that is identical to said M number of needles; and based on processing of said bitmap image, to generate and to send knitting instructions to the knit controller of the seamless circular knitting machine, based on a direct one-to-one correlation between (I) an Nth pixel in an Rth row of said bitmap image, and (II) needle activity of a corresponding Nth needle out of said M needles when said Nth needle knits in the Rth row of a knitted product;

wherein in the digital computational design tool, the one or more hardware processors are further configured:

to generate an on-screen Graphic User Interface (GUI) element that enables a user to modify an attribute of a content of said bitmap image;

to detect a user command, via said on-screen GUI element, requesting a modification of said attribute of the content of said bitmap image; and in response to detecting said user command, to perform said modification of said attribute, and to generate an updated version of said bitmap image which represents an updated version of said knitted product.

\* \* \* \* \*